US012672160B2

(12) United States Patent
Kim

(10) Patent No.: US 12,672,160 B2
(45) Date of Patent: Jun. 30, 2026

(54) METHOD FOR BEAM MANAGEMENT OF COMMUNICATION DEVICE IN WIRELESS COMMUNICATION SYSTEM AND APPARATUS USING METHOD

(71) Applicant: ELECTRONICS AND TELECOMMUNICATIONS RESEARCH INSTITUTE, Daejeon (KR)

(72) Inventor: Ji Hyung Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 312 days.

(21) Appl. No.: 18/230,469

(22) Filed: Aug. 4, 2023

(65) Prior Publication Data

US 2024/0244654 A1     Jul. 18, 2024

(30) Foreign Application Priority Data

Aug. 8, 2022   (KR) ........................ 10-2022-0098854
Aug. 2, 2023   (KR) ........................ 10-2023-0100988

(51) Int. Cl.
| | |
|---|---|
| *H04W 72/542* | (2023.01) |
| *H04B 7/14* | (2006.01) |
| *H04L 5/00* | (2006.01) |
| *H04W 72/0446* | (2023.01) |
| *H04W 72/232* | (2023.01) |
| *H04W 84/04* | (2009.01) |

(52) U.S. Cl.
CPC ......... *H04W 72/542* (2023.01); *H04L 5/0053* (2013.01); *H04W 72/0446* (2013.01); *H04W 72/232* (2023.01); *H04W 84/047* (2013.01)

(58) Field of Classification Search
None
See application file for complete search history.

(56) References Cited

U.S. PATENT DOCUMENTS

| | | | |
|---|---|---|---|
| 8,600,418 B2 | 12/2013 | Ko et al. | |
| 9,432,175 B2 | 8/2016 | Chen et al. | |
| 9,924,508 B2 | 3/2018 | Ohta et al. | |
| 10,523,791 B2 | 12/2019 | Bao et al. | |
| 10,567,985 B2 | 2/2020 | Zhang | |
| 2012/0224472 A1 | 9/2012 | Kim et al. | |
| 2019/0097874 A1* | 3/2019 | Zhou .................. | H04B 7/06966 |
| 2020/0344843 A1 | 10/2020 | Zhu et al. | |
| 2022/0007442 A1 | 1/2022 | Novlan et al. | |

(Continued)

OTHER PUBLICATIONS

3GPP, "3rd Generation Partnership Project; Technical Specification Group Radio Access network; Study on NR network-controlled repeaters; (Release 18)", 3GPP TR 38.867 V0.1.0 (May 2022).

*Primary Examiner* — Duc T Duong
(74) *Attorney, Agent, or Firm* — LRK PATENT LAW FIRM

(57) ABSTRACT

A beam management and control method of a communication device performing a relay function, a method of communicating with a UE of the communication device according to the quality of a link between the communication device and a base station, and a method of measuring the quality of a link between the communication device and the UE are provided.

15 Claims, 22 Drawing Sheets

NEW TYPE OF REPEATER
(1630)

BASE STATION (1610)        UE (1650)

1620      1631  1632      1640

- - - - - - ► : COMMUNICATION LINK BETWEEN BASE STATION AND NEW TYPE OF REPEATER

————► : COMMUNICATION LINK BETWEEN NEW TYPE OF REPEATER AND UE

(56) References Cited

U.S. PATENT DOCUMENTS

| | | | |
|---|---|---|---|
| 2023/0319918 A1* | 10/2023 | Dutta | H04W 72/046 |
| | | | 370/329 |
| 2023/0327735 A1* | 10/2023 | Awadin | H04B 7/0695 |
| 2023/0354234 A1* | 11/2023 | Abedini | H04W 56/0045 |
| 2023/0361827 A1* | 11/2023 | Fan | H04B 7/0617 |
| 2024/0022315 A1* | 1/2024 | Kusashima | H04W 16/26 |
| 2024/0155627 A1* | 5/2024 | Yuan | H04W 72/044 |
| 2024/0364414 A1* | 10/2024 | Wanuga | H04B 7/15528 |
| 2024/0381117 A1* | 11/2024 | Yoshioka | H04W 72/0453 |
| 2025/0024271 A1* | 1/2025 | Kobayashi | H04B 7/06 |
| 2025/0062823 A1* | 2/2025 | Yan | H04B 7/15528 |
| 2025/0112680 A1* | 4/2025 | Sen | H04B 7/0639 |
| 2025/0193694 A1* | 6/2025 | Kurita | H04W 16/28 |
| 2025/0202552 A1* | 6/2025 | Ban | H04W 72/0446 |
| 2025/0202565 A1* | 6/2025 | Nilsson | H04B 7/06952 |
| 2025/0240085 A1* | 7/2025 | You | H04B 7/15528 |
| 2026/0031939 A1* | 1/2026 | Guan | H04L 5/0023 |

* cited by examiner

FIG. 4

FIG. 5 gNB

Figure 5:
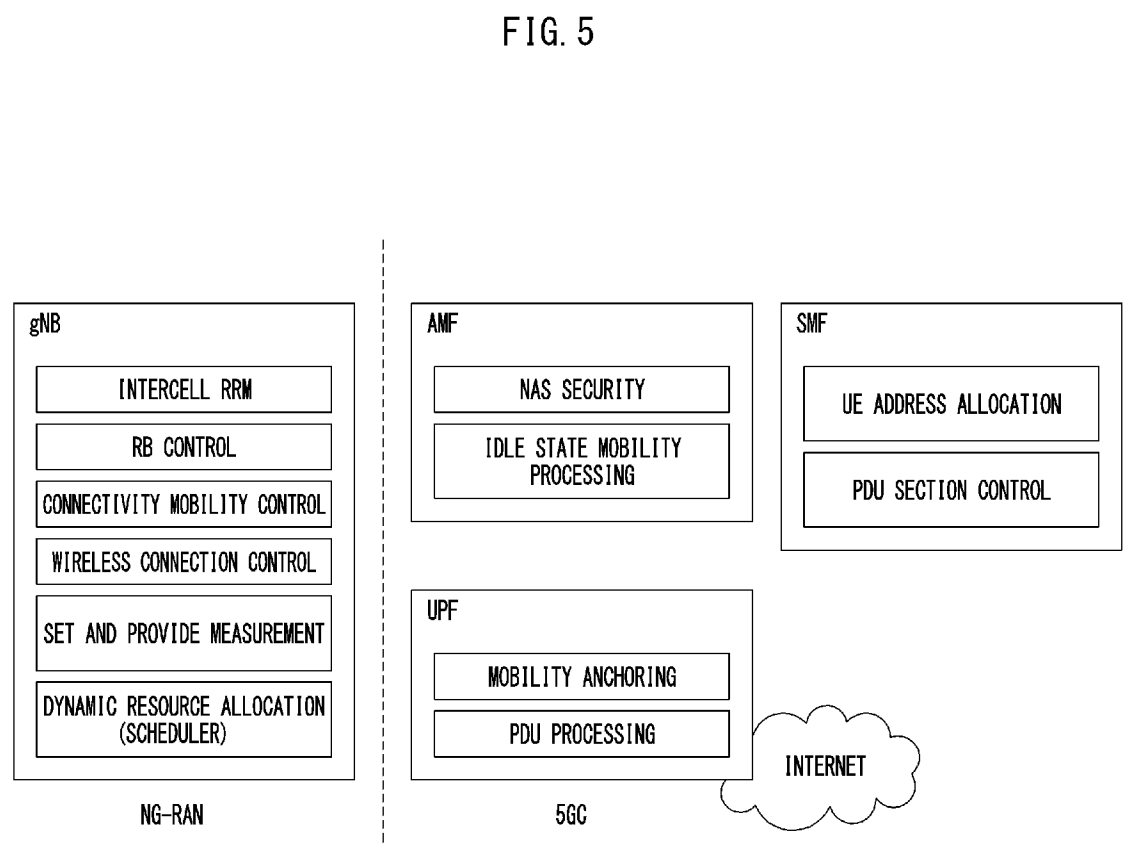

- INTERCELL RRM
- RB CONTROL
- CONNECTIVITY MOBILITY CONTROL
- WIRELESS CONNECTION CONTROL
- SET AND PROVIDE MEASUREMENT
- DYNAMIC RESOURCE ALLOCATION (SCHEDULER)

NG-RAN

AMF

- NAS SECURITY
- IDLE STATE MOBILITY PROCESSING

SMF

- UE ADDRESS ALLOCATION
- PDU SECTION CONTROL

UPF

- MOBILITY ANCHORING
- PDU PROCESSING

5GC

INTERNET

Fiber transport

BACKHAUL LINK

ACCESS LINK

UE: SA with NGC
IAB-node: SA with NGC

Access Point

Reconfigurable
Intelligent Surface

Device

Controller

1400

BASE STATION (1410)

1420

NEW TYPE OF REPEATER (1430)

1440

UE (1450)

---- : COMMUNICATION LINK BETWEEN BASE STATION AND NEW TYPE OF REPEATER

——→ : COMMUNICATION LINK BETWEEN NEW TYPE OF REPEATER AND UE

BASE STATION (1510)

1561, 1562

1520

1571, 1572

NEW TYPE OF REPEATER (1530)

1581, 1582

1591, 1592

1540

UE (1550)

------→ : COMMUNICATION LINK BETWEEN BASE STATION AND NEW TYPE OF REPEATER

———→ : COMMUNICATION LINK BETWEEN NEW TYPE OF REPEATER AND UE

FIG. 16

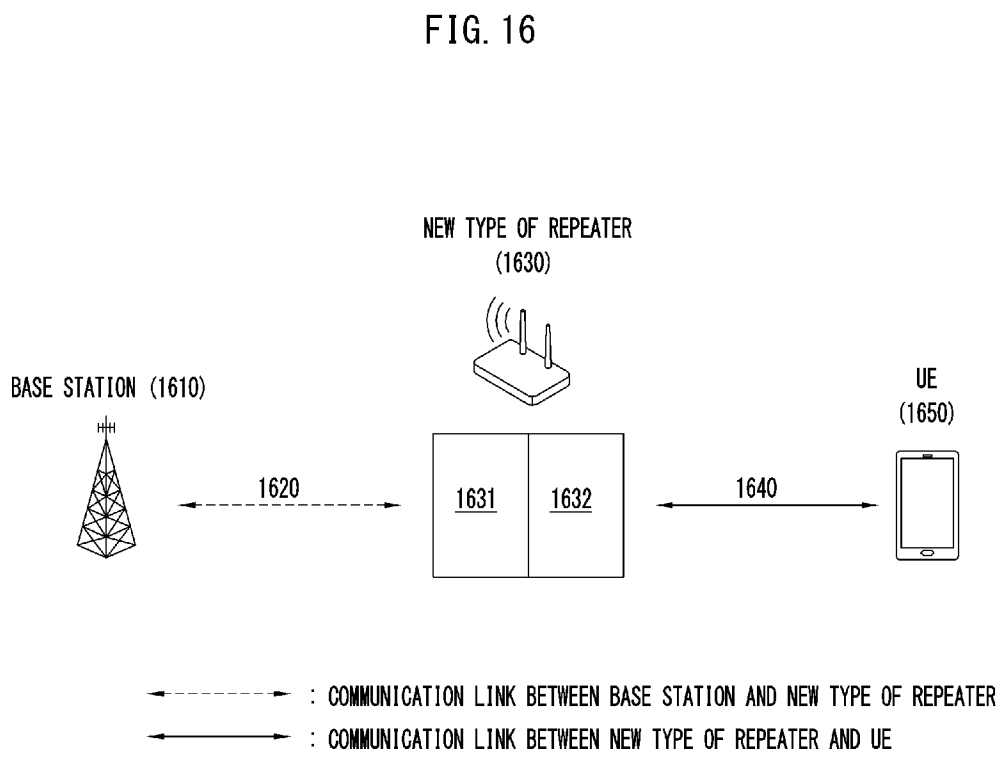

NEW TYPE OF REPEATER
(1630)

UE
(1650)

1640

1632

1631

1620

BASE STATION (1610)

- - - - → : COMMUNICATION LINK BETWEEN BASE STATION AND NEW TYPE OF REPEATER

←——→ : COMMUNICATION LINK BETWEEN NEW TYPE OF REPEATER AND UE

NEW TYPE OF REPEATER
(1710)

| (1711) | (1712) |
|---|---|
| | RLC |
| | MAC |
| | PHY |

FIG. 19

UE (6-00)                                              gNB (6-10)

Msg1: Preamble (6-20)

Msg2: RACH response (6-30)

Msg3: PUSCH (6-40)

Nsg4: Contection resolution (6-50)

HARQ ACK (6-60)

RECEIVE CONTROL INFORMATION
FROM BASE STATION                    S2210

COMMUNICATE WITH UE BASED
ON CONTROL INFORMATION               S2220

FIG. 23

METHOD FOR BEAM MANAGEMENT OF COMMUNICATION DEVICE IN WIRELESS COMMUNICATION SYSTEM AND APPARATUS USING METHOD

CROSS-REFERENCE TO RELATED APPLICATIONS

This application claims priority to Korean Patent Applications No. 10-2022-0098854, filed on Aug. 8, 2022, and No. 10-2023-0100988, filed on Aug. 2, 2023, with the Korean Intellectual Property Office (KIPO), the entire contents of which are hereby incorporated by reference.

BACKGROUND

1. Technical Field

Example embodiments of the disclosure relate in general to wireless communication, and more specifically, to a beam management method of a communication device in a wireless communication system and an apparatus using the same.

2. Description of Related Art

As more communication devices require a larger communication capacity, there is a growing need for enhanced mobile broadband communication compared to existing radio access technology (RAT). Massive machine type communications (MTC) connecting a number of devices and objects to provide a variety of services at any time and any place is one major issue to be considered in next-generation communication. In addition, communication system design considering services/terminals sensitive to reliability and latency is being discussed. The introduction of next-generation RAT considering such enhanced mobile broadband communication, massive MTC, ultra-reliable and low-latency communication (URLLC), and the like is being discussed. For convenience of description, the next-generation RAT will be referred to herein as new RAT or NR.

New types of network nodes have been considered to increase flexibility in building a network by mobile carriers. For example, an integrated access and backhaul (IAB) has been introduced and new types of network nodes that do not need a wired backhaul have been developed. As another type of network node, there is a radio-frequency (RF) repeater that simply amplifies and delivers all received signals. The RF repeater has been deployed over a wide range of wireless communication systems to complement the coverage provided by a general full stack cell. In NR, RF and electromagnetic compatibility (EMC) requirements for RF repeaters for NR targeting both FR1 and FR2 have been specified.

Meanwhile, an intelligent reflecting surface (IRS) has attracted attention as a relay node performing functions similar to those of a repeater. The IRS is a planar surface with passive elements formed of a metamaterial (hereinafter referred to as IRS elements), in which a phase of a received signal is changed by the IRS elements to form beams in a desired shape and reflect or pass a received signal to which the formed beams are applied. The IRS may also be referred to as a reconfigurable intelligent surface (RIS) or the like.

SUMMARY

The present disclosure suggests a beam management and control method of a communication device performing a relay function, a method of communicating with a UE of the communication device according to the quality of a link between the communication device and a base station, and a method of measuring the quality of a link between the communication device and the UE.

According to an aspect, a method performed by a user equipment (UE) in a wireless communication system may comprise: receiving downlink control information (DCI) transmitted from a base station; and performing communication with a communication device on the basis of the DCI, wherein the communication device comprises a device that relays a signal transmitted between the UE and the base station, the DCI comprises a first field related to beam information and a second field related to a time resource, and the communication is performed using a beam determined based on at least one of the first field and the second field.

The beam may comprise a beam aperiodically determined on the basis of the DCI.

The UE may receive the DCI through the communication device.

The UE may receive the DCI in a first time resource, the first time resource may be determined based on a time offset and a second time resource in which the communication device receives the DCI from the base station.

The time offset may be determined based on capability of the communication device.

The first field may indicate one of a plurality of beams set for the UE, and the second field may indicate one of a plurality of time resources set for the UE.

Information about the plurality of beams and the plurality of time resources may be transmitted to the UE through radio resource control (RRC) signaling.

The plurality of beams may be associated with the plurality of time resources.

Each of the plurality of beams may be mapped to one of the plurality of time resources.

According to another aspect, an apparatus may comprise a user equipment (UE) comprising: at least one memory storing instructions; at least one transceiver; and at least one processor configured to connect the at least one memory and the at least one transceiver, wherein the at least one processor executes the instructions to: receive downlink control information (DCI) transmitted from a base station; and perform communication with a communication device on the basis of the DCI, wherein the communication device comprises a device that relays a signal transmitted between the UE and the base station, the DCI comprises a first field related to beam information and a second field related to a time resource, and the communication is performed using a beam determined based on at least one of the first field or the second field.

The beam may comprise a beam aperiodically determined on the basis of the DCI.

The UE may receive the DCI through the communication device.

The UE may receive the DCI in a first time resource, wherein the first time resource may be determined based on a time offset and a second time resource in which the communication device receives the DCI from the base station.

The time offset may be determined based on capability of the communication device.

The first field may indicate one of a plurality of beams set for the UE, and the second field may indicate one of a plurality of time resources set for the UE.

Information about the plurality of beams and the plurality of time resources may be transmitted to the UE through radio resource control (RRC) signaling.

The plurality of beams may be associated with the plurality of time resources.

Each of the plurality of beams may be mapped to one of the plurality of time resources.

According to yet another aspect, a computer readable medium readable by at least one computer and storing instructions executable by at least one processor is provided, and the instructions are executed by the at least one processor to: receive downlink control information (DCI) transmitted from a base station; and perform communication with a communication device on the basis of the DCI, wherein the communication device comprises a device that relays a signal transmitted between a user equipment (UE) and the base station, the DCI comprises a first field related to beam information and a second field related to a time resource, and the communication is performed using a beam determined based on at least one of the first field and the second field.

According to the present disclosure, it is possible to perform beam control for a communication device capable of performing a relay function and differentiate between a link between a base station and the communication device and a link between a UE and the communication device, thereby improving the relay function and efficiency and achieving an effect of increasing coverage.

BRIEF DESCRIPTION OF DRAWINGS

The following drawings have been prepared to describe concrete examples of the present disclosure. The names of the devices or specific signals/messages/fields illustrated in the drawings are provided as examples and thus the technical features of the present disclosure are not limited thereby.

FIG. 4 illustrates another example of a wireless communication system to which the technical features of the present disclosure are applicable.

FIG. 5 illustrates functional division between NG-RAN and 5GC.

FIG. 16 illustrates examples of a flow of transmission of a signal from a base station to a UE and a structure of a new type of repeater.

FIG. 19 is a diagram illustrating an example of a structure of transmitting QCL information by setting and indicating a transmission configuration information (TCI) state.

FIG. 23 illustrates examples of a wireless device applicable to the present disclosure.

DETAILED DESCRIPTION OF THE EMBODIMENTS

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example" Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

Figure 1:
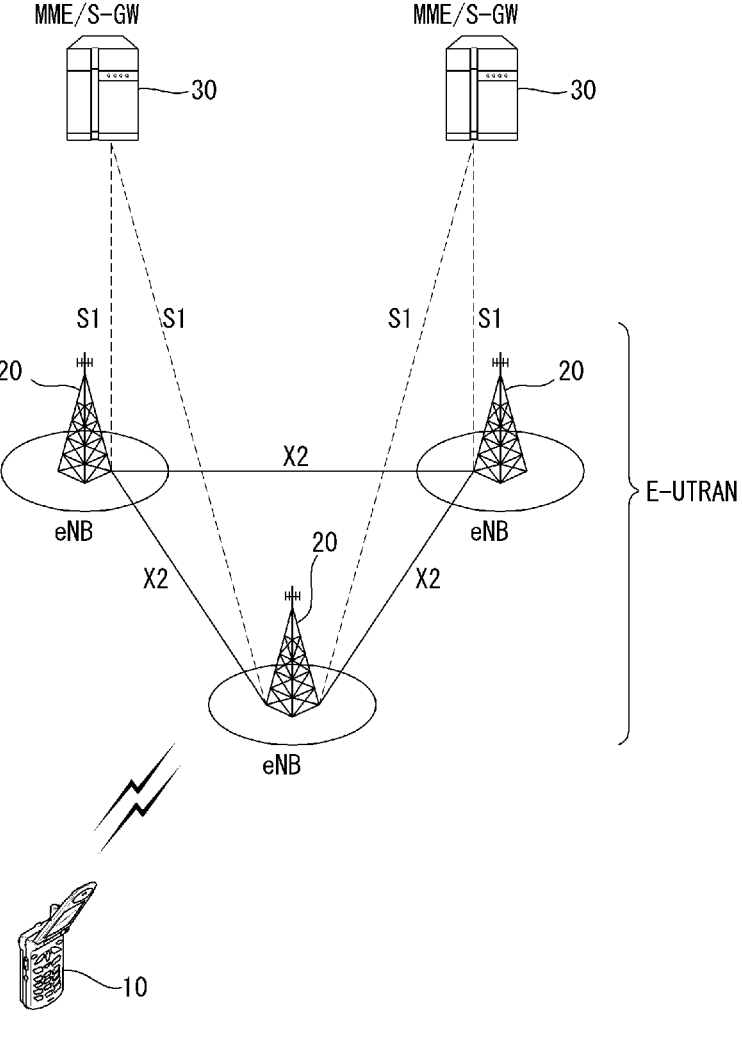
FIG. 1 illustrates a wireless communication system to which the present disclosure is applicable.

FIG. 1 illustrates a wireless communication system to which the present disclosure is applicable. The wireless communication system may also be referred to as an evolved-UMTS terrestrial radio access network (E-UTRAN) or a long-term evolution (LTE)/LTE-A system.

An E-UTRAN includes a base station (BS) 20 that provides a control plane and a user plane to a user equipment (UE) 10. The UE 10 may be fixed or mobile and may be referred to by another term, e.g., "mobile station (MS)," "user terminal (UT)," "subscriber station (SS)," "mobile terminal (MT)," or "wireless device." The BS 20 is a fixed station communicating with the UE 10 and may be referred to by another term, e.g., "evolved-NodeB (eNB)," "base transceiver system (BTS)," or "access point."

BSs 20 may be connected to each other via an X2 interface. The BS 20 is connected to an evolved packet core (EPC) 30 through an S1 interface, and more specifically, to a mobility management entity (MME) through an S1-MME and a serving gateway (S-GW) through an S1-U.

The EPC 30 includes an MME, an S-GW, and a packet data network-gateway (P-GW). The MME stores access information or information about the capability of a UE, and the stored information is generally used for mobility management of the UE. The S-GW is a gateway having an E-UTRAN as an end point, and the P-GW is a gateway having a PDN as an end point.

Layers of a radio interface protocol between a UE and a network may be divided into a first layer L1, a second layer L2, and a third layer L3 on the basis of three lower layers of an open system interconnection (OSI) reference model well known in communication systems, wherein a physical layer belonging to the first layer provides an information transfer service using a physical channel, and a radio resource control (RRC) layer on the third layer controls radio resources between the UE and the network. To this end, the RRC layer exchanges RRC messages between the UE and a BS.

Figure 2:
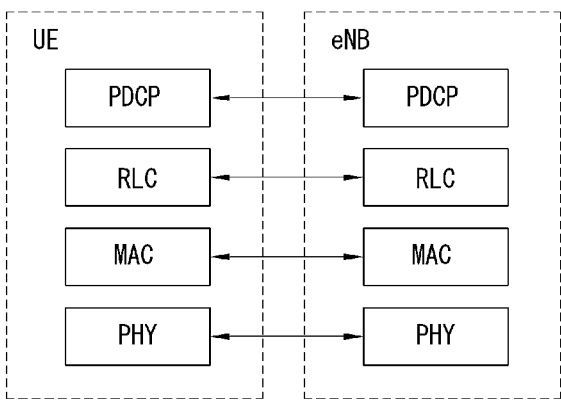
FIG. 2 is a block diagram illustrating a radio protocol architecture for a user plane.
Figure 3:
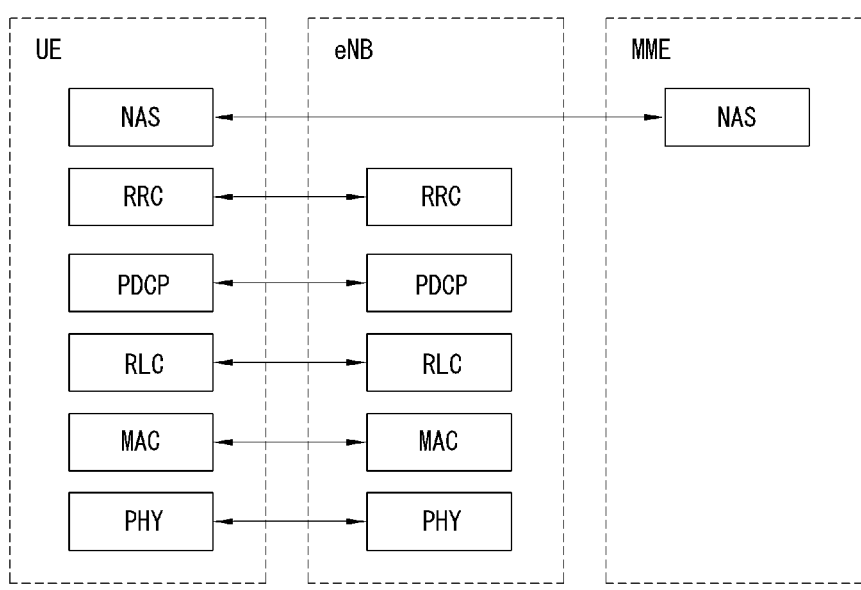
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. The user plane is a protocol stack for transmission of user data, and the control plane is a protocol stack for transmission of control signals.

Referring to FIGS. 2 and 3, a physical layer PHY provides a higher layer with an information transfer service using a physical channel. The physical layer PHY is connected to a medium access control (MAC) layer, which is a higher layer, through a transport channel. Data is transmitted between the MAC layer and the physical layer PHY through the transport channel. Transmission channels are classified according to methods and features of data transmission through a wireless interface.

Data is transferred between different physical layers, i.e., between physical layers of a transmitter and a receiver, through a physical channel. The physical channel may be modulated by an orthogonal frequency division multiplexing (OFDM) method, and time and frequency may be used as radio resources therefor.

Functions of the MAC layer include mapping between a logical channel and the transport channel, and multiplexing/demultiplexing to a transport block provided as the physical channel over a transport channel of a MAC service data unit (SDU) belonging to the logical channel. The MAC layer provides services to a radio link control (RLC) layer through the logical channel.

Functions of the RLC layer include concatenation, segmentation, and reassembly of an RLC SDU. The RLC layer provides three operation modes, i.e., a transparent mode (TM), an unacknowledged mode (UM), and an acknowledged mode (AM), to secure various qualities of service (QoSs) required by a radio bearer (RB). AM RLC provides error correction through an automatic repeat request (ARQ).

A radio resource control (RRC) layer is defined only with respect to the control plane. The RRC layer controls a logical channel, the transport channel, the physical channel, and the like in relation to a configuration, a re-configuration, and a release of RBs. An RB is a logical path provided by a first layer (a PHY layer) and second layers (an MAC layer, an RLC layer, and a packet data convergence protocol (PDCP) layer) for the transmission of data between a UE and a network.

Functions of the PDCP layer on the user plane include the transmission of user data, header compression, and ciphering. Functions of the PDCP layer on the control plane include the transmission of control plane data and ciphering/integrity protection.

The setting of the RB is a process of defining characteristics of a radio protocol layer and a channel to provide a specific service, and setting specific parameters and operating methods thereof. The RB may be divided into two types of RBs: a signaling RB (SRB) and a data RB (DRB). The SRB is used as a path for transmitting an RRC message on the control plane, and the DRB is used as a path for transmitting user data on the user plane.

A UE is in an RRC connected state when an RRC connection is established between an RRC layer of the UE and an RRC layer of an E-UTRAN, and is in an RRC idle state otherwise.

Examples of downlink transport channels for transmission of data to a UE from a network include a broadcast channel (BCH) for transmitting system information and a downlink shared channel (SCH) for transmitting user traffic or control messages. Transmission of traffic or control messages using downlink multicast or broadcast services may be performed through a downlink SCH or a separate downlink multicast channel (MCH). Meanwhile, examples of uplink transport channels for transmission of data from a UE to a network include a random access channel (RACH) for transmitting an initial control message and an uplink SCH for transmitting user traffic or control messages.

Examples of logical channels located on the transport channel and mapped to the transport channel include a broadcast control channel (BCCH), a paging control channel (PCCH), a common control channel (CCCH), a multicast control channel (MCCH), a multicast traffic channel (MTCH), etc.

A physical channel consists of several OFDM symbols in a time domain and several subcarriers in a frequency domain. One subframe includes a plurality of OFDM symbols in the time domain. A resource block is a resource allocation unit and includes a plurality of OFDM symbols and a plurality of sub-carriers. Certain subcarriers of certain OFDM symbols (e.g., a first OFDM symbol) of each subframe may be used for a physical downlink control channel (PDCCH), i.e., an L1/L2 control channel. A transmission time interval (TTI) is a transmission unit time and may be, for example, a subframe or a slot.

A new radio access technology (new RAT or NR) will be described below.

As more communication devices require a larger communication capacity, there is a growing need for enhanced mobile broadband communication compared to existing radio access technology (RAT). Massive machine type communications (MTC) connecting a number of devices and objects to provide a variety of services at any time and any place is one major issue to be considered in next-generation communication. In addition, communication system design considering services/terminals sensitive to reliability and latency is being discussed. The introduction of next-generation RAT considering such enhanced mobile broadband communication, massive MTC, ultra-reliable and low-latency communication (URLLC), and the like is being discussed. For convenience of description, the next-generation RAT will be referred to herein as new RAT or NR.

Figure 4:
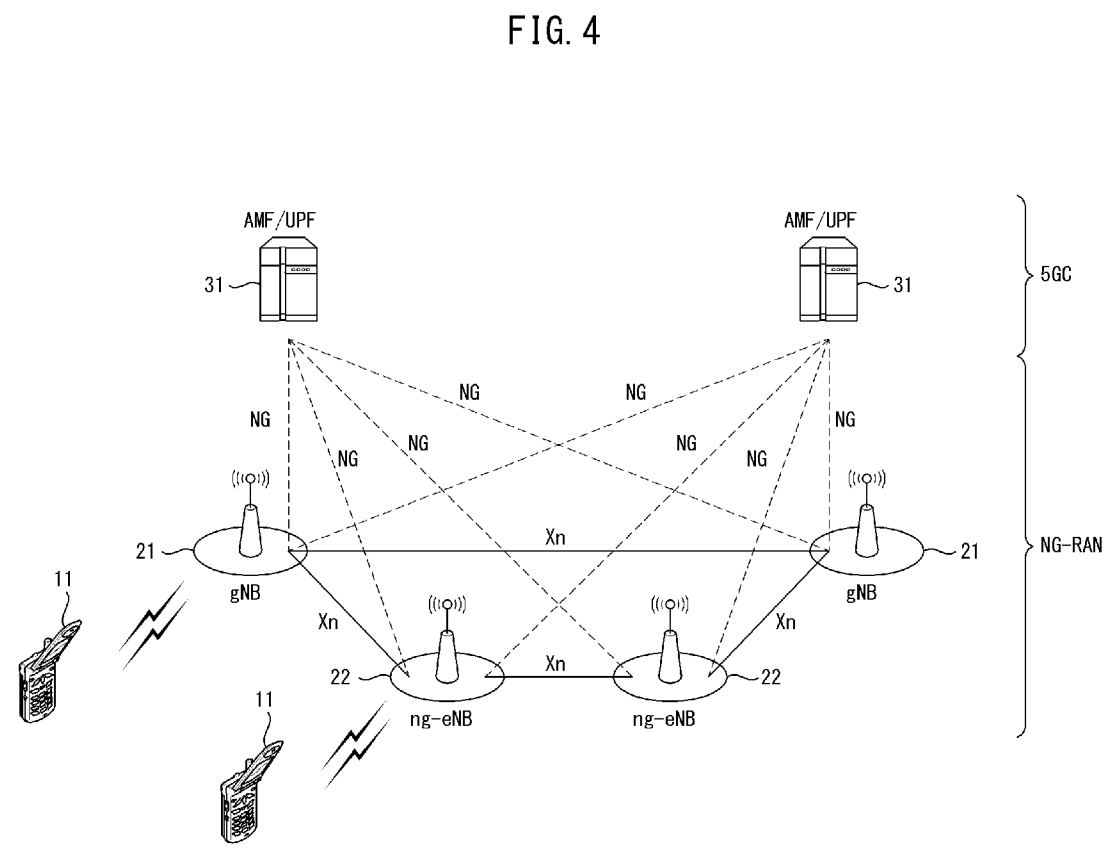

FIG. 4 illustrates another example of a wireless communication system to which the technical features of the present disclosure are applicable.

Specifically, FIG. 4 illustrates a system architecture based on a 5G new radio access technology (NR) system. Entities used in the 5G NR (hereinafter referred to as simply as "NR") system may absorb some or all of the functions of the entities introduced in FIG. 1 (e.g., eNB, MME, and S-GW). Entities used in the NR system may be identified by a name "NG" to distinguish them from LTE.

Referring to FIG. 4, a wireless communication system includes one or more UEs 11, a next-generation RAN (NG-RAN), and a fifth-generation core network (5GC). The NG-RAN includes at least one NG-RAN node. The NG-RAN node is an entity corresponding to the BS 20 illustrated in FIG. 1. The NG-RAN node includes at least one gNB 21 and/or at least one ng-eNB 22. The gNB 21 provides the termination of an NR user plane and a control plane protocol toward the UE 11. The Ng-eNB 22 provides the termination of an E-UTRA user plane and a control plane protocol toward the UE 11.

The 5GC includes an access and mobility management function (AMF), a user plane function (UPF), and a session management function (SMF). The AMF hosts functions such as NAS security and idle state mobility processing. The AMF is an entity including functions of a conventional MME. The UPF hosts functions such as mobility anchoring and protocol data unit (PDU) processing. The UPF is an entity including functions of a conventional S-GW. The SMF hosts functions such as UE IP address allocation and PDU session control.

The gNB and the ng-eNB are connected to each other through an Xn interface. The gNB and the ng-eNB are connected to the 5GC through an NG interface. More specifically, the gNB and the ng-eNB are connected to the AMF through an NG-C interface and to the UPF through an NG-U interface.

FIG. 5 illustrates functional division between NG-RAN and 5GC.

Referring to FIG. 5, a gNB may provide functions such as inter-cell RRM, RB control, connection mobility control, radio admission control, measurement configuration & provision, and dynamic resource allocation. The AMF may provide functions such as NAS security and idle state mobility processing. The UPF may provide functions such as mobility anchoring and PDU processing. The session management function (SMF) may provide functions such as UE IP address allocation and PDU session control.

Figure 6:
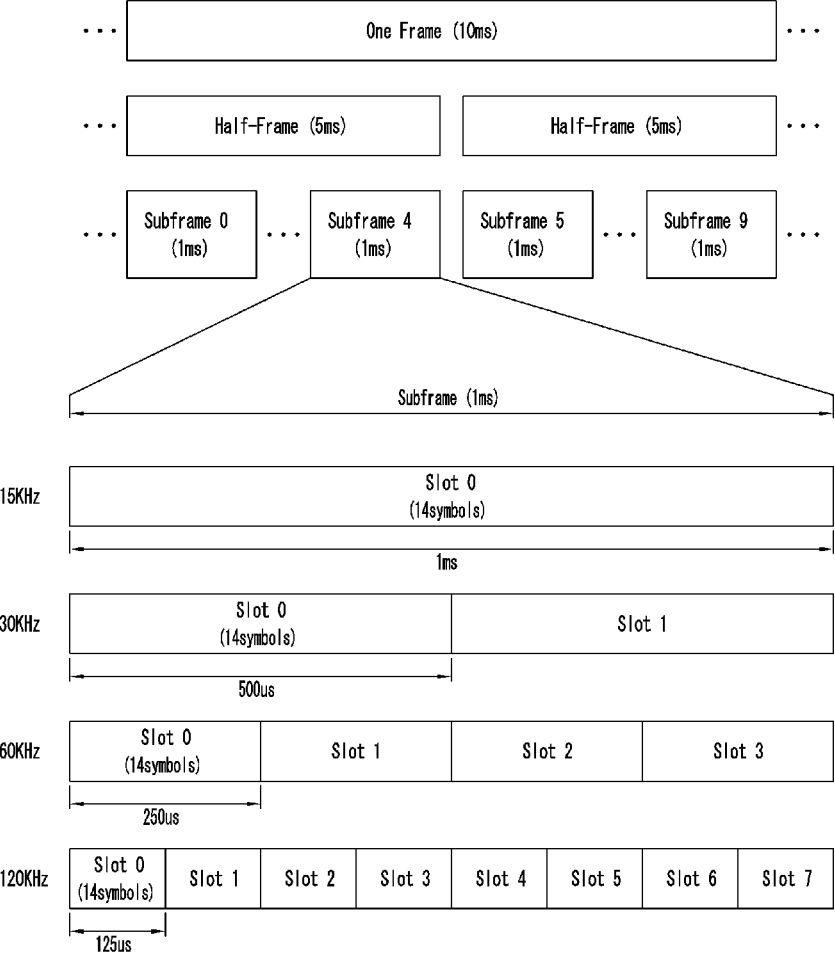
FIG. 6 illustrates a frame structure applicable to the NR.

FIG. 6 illustrates a frame structure applicable to the NR.

Referring to FIG. 6, a frame may be 10 milliseconds (ms) long and include ten subframes each being 1 ms long.

In NR, uplink and downlink transport layers may each include frames. A radio frame may be 10 ms long and be defined as two 5 ms half-frames (HF). A half-frame may be defined as five 1 ms subframes (SF). A subframe is divided into one or more slots, and the number of slots in the subframe depends on subcarrier spacing. Each slot includes twelve or fourteen OFDM (A) symbols according to a cyclic prefix (CP). When a normal CP is used, each slot includes fourteen symbols. When an extended CP is used, each slot includes twelve symbols. Here, the symbols may include OFDM symbols (or CP-OFDM symbols) and SC-FDMA symbols (or DFT-s-OFDM symbols).

One or more slots may be included in a subframe according to the subcarrier spacing.

Table 1 below shows a subcarrier spacing configuration μ.

TABLE 1

| μ | $\Delta f = 2^\mu \cdot 15[\text{kHz}]$ | Cyclic prefix (CP) |
|---|---|---|
| 0 | 15 | Normal |
| 1 | 30 | Normal |
| 2 | 60 | Normal, Extended |
| 3 | 120 | Normal |
| 4 | 240 | Normal |

Table 2 below shows the number of slots per frame $$N_{slot}^{frame,\mu},$$

the number of slots per subframe $$N_{slot}^{subframe,\mu},$$

the number of symbols per slot $$N_{symb}^{slot},$$

etc. according to the subcarrier spacing configuration μ.

TABLE 2

| $N_{symb}^{slot}$ | $N_{slot}^{frame,\mu}$ | $N_{slot}^{subframe,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 3 below shows the number of symbols per slot, the number of slots per frame, and the number of slots per subframe (SF) according to SCS when an extended CP is used.

TABLE 3

| SCS $(15 \cdot 2^\mu)$ | $N_{symb}^{slot}$ | $N_{slot}^{frame,\mu}$ | $N_{slot}^{subframe,\mu}$ |
|---|---|---|---|
| 60 kHz (μ = 2) | 12 | 40 | 4 |

NR supports a number of numerologies (or subcarrier spacing (SCS)) to support various 5G services. For example, NR supports a wide area at conventional cellular bands when the SCS is 15 kHz, supports a dense-urban, a lower latency, and a wider carrier bandwidth when the SCS is 30 kHz/60 kHz, and supports a bandwidth higher than 24.25 GHz to fix phase noise when the SCS is 60 kHz or higher.

An NR frequency band may be defined as two types of frequency ranges FR1 and FR2. Numerical values of the frequency ranges may be changed, and for example, frequency ranges of the two types of frequency ranges FR1 and FR2 may be as shown in Table 4 below. For convenience of description, among frequency ranges used in an NR system, FR1 may be sub 6 GHz range, and FR2 may be above 6 GHz range and be referred to as a millimeter wave (mmW).

TABLE 4

| Frequency range designation | Corresponding frequency range | Subcarrier spacing |
|---|---|---|
| FR1 | 450 MHz to 6000 MHz | 15, 30, 60 kHz |
| FR2 | 24250 MHz to 52600 MHz | 60, 120, 240 kHz |

As described above, the numerical values of the frequency ranges of the NR system may be changed. For example, FR1 may include a band of 410 MHz to 7125 MHz as shown in Table 5 below. That is, FR1 may include a frequency band of 6 GHz or higher (or 5850 MHz, 5900 MHZ, 5925 MHz, or the like). For example, a frequency band of 6 GHz or higher (or 5850 MHz, 5900 MHZ, 5925 MHz, or the like), which is included in FR1, may include an unlicensed band. The unlicensed band can be used for various purposes, e.g., communication for vehicles (e.g., autonomous driving).

TABLE 5

| Frequency range designation | Corresponding frequency range | Subcarrier spacing |
|---|---|---|
| FR1 | 410 MHz to 7125 MHz | 15, 30, 60 kHz |
| FR2 | 24250 MHz to 52600 MHz | 60, 120, 240 kHz |

In the NR system, OFDM(A) numerology (e.g., SCS, CP length, etc.) may be set differently for multiple cells merged into one UE. Accordingly, (absolute time) periods of time resources consisting of the same number of symbols (e.g., SFs, slots, or TTIs) (referred to collectively as time units (TUs) for convenience of description) may be set differently for merged cells.

Figure 7:
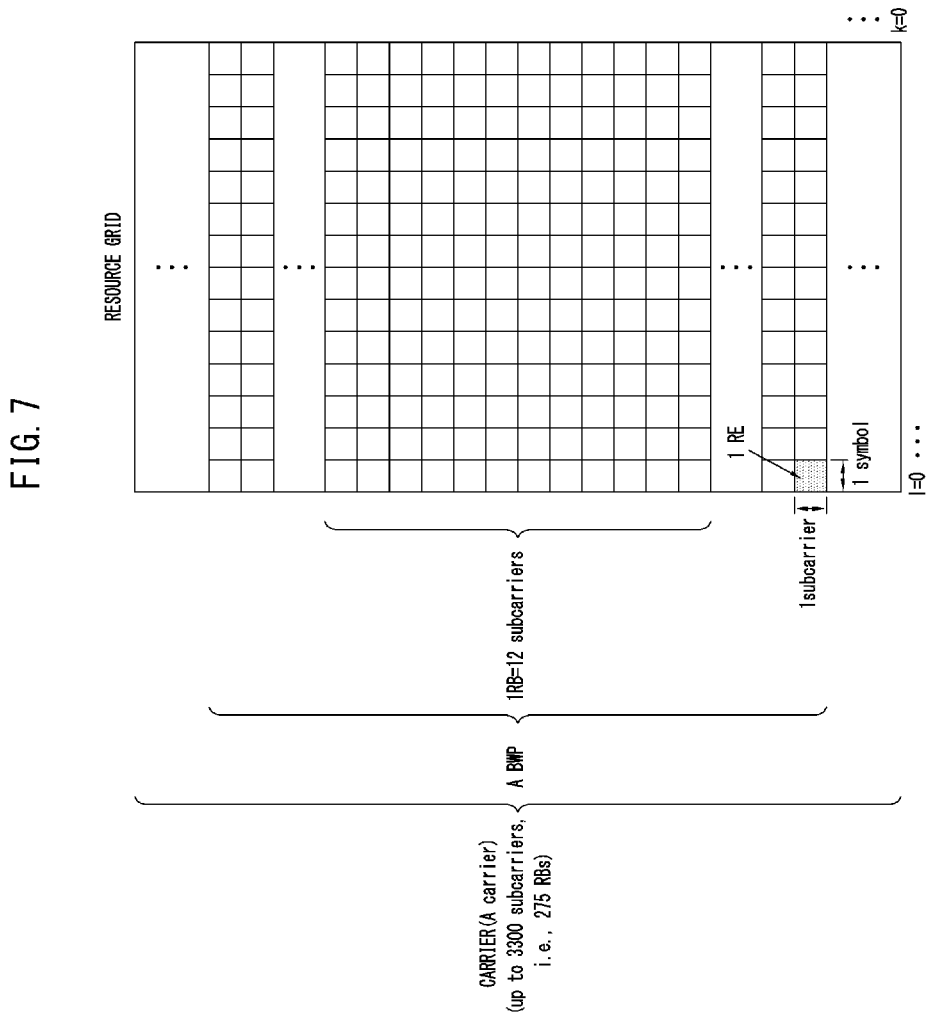
FIG. 7 illustrates a slot structure.

FIG. 7 illustrates a slot structure.

Referring to FIG. 7, a slot includes a plurality of symbols in a time domain. For example, one slot may include fourteen symbols in the case of a normal CP but may include twelve symbols in the case of an extended CP. Alternatively, one slot may include seven symbols in the case of the normal CP but may include six symbols in the case of the extended CP.

A carrier includes a plurality of subcarriers in a frequency domain. A resource block (RB) may be defined as a plurality of consecutive subcarriers (e.g., twelve consecutive subcarriers) in the frequency domain. A bandwidth part (BWP) may be defined as a plurality of consecutive (P)RBs in the frequency domain and may correspond to one numerology (e.g., a SCS, a CP length, or the like). A carrier wave may include up to N (e.g., five) BWPs. Data communication may be performed through an activated BWP. Each element may be referred to as a resource element (RE) in a resource grid, and one complex symbol may be mapped thereto.

A physical downlink control channel (PDCCH) may include one or more control channel elements (CCE) as shown in the following table.

TABLE 6

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through resources including one, two, four, eight or sixteen CCEs. Here, each CCE includes six resource element groups (REGs), and one REG includes one resource block in the frequency domain and one orthogonal frequency division multiplexing (OFDM) symbol in the time domain.

Meanwhile, in NR, a new unit called a control resource set (CORESET) may be employed. A UE may receive the PDCCH from the CORESET.

An integrated access and backhaul link (IAB) will be described below. Meanwhile, for convenience of description, a proposal method will be described below based on the new RAT (NR) system. However, a range of systems to which the proposed method is applicable may be extended to other types of systems such as 3GPP LTE/LTE-A systems, as well as the NR system.

One potential technology aimed at realizing future cellular network deployment scenarios and applications enables flexible and very dense deployment of NR cells without proportionally densifying transport networks to support wireless backhaul and relay links.

It is expected that with massive multi-input multi-output (MIMO) or natural deployment of a multi-beam system, a larger bandwidth (e.g., an mmWave spectrum) will be available in NR, compared to LTE, and thus opportunities for integrated access and backhaul links will be generated. Therefore, a number of control and data channels/procedures defined to provide connection or access to UEs can be built to allow easier deployment of a dense network of self-backhauled NR cells in a more integrated manner. Such a system is called an IAB.

The present disclosure defines the following:

AC(x): Access link between a node x and UEs; and

BH(xy): Backhaul link between a node x and a node y.

In this case, each node may be understood as a donor gNB (DgNB) or a relay node RN. Here, the DgNB or the donor node may be a gNB that provides a function of supporting a backhaul for IAB nodes.

In the present disclosure, when there are a relay node 1 and a relay node 2 and the relay node 1 is connected to the relay node 2 through a backhaul link to relay data transmitted to and received from the relay node 2, the relay node 1 will be referred to as a parent node of the relay node 2 and the relay node 2 will be referred to as a child node of the relay node 1 for convenience of description.

The following drawings are prepared to describe specific examples of the present disclosure. The names of specific devices or specific signals/messages/fields illustrated in the drawings are provided as examples and thus the technical features of the present disclosure are not limited thereby.

Figure 8:
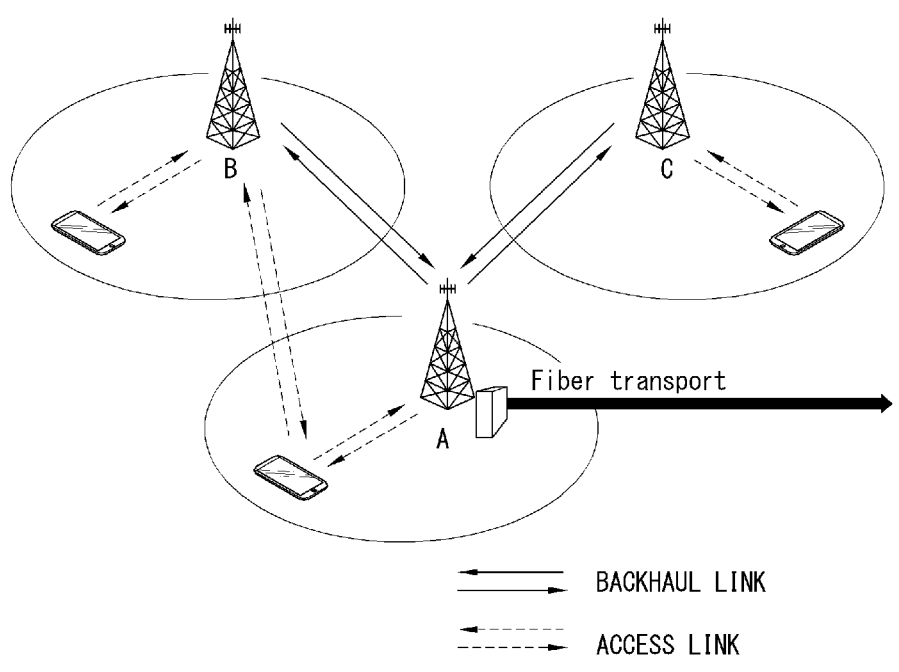
FIG. 8 schematically illustrates an example of a network with integrated access and backhaul links (IAB).

FIG. 8 schematically illustrates an example of a network with integrated access and backhaul links (IAB).

Referring to FIG. 8, relay nodes (rTRP) may be capable of multiplexing access and backhaul links (i.e., beam-based operations) in a time, frequency or space domain.

Different links may operate at the same frequency or different frequencies (each may be referred to as an "in-band" or "out-band" relay). Although efficient support of out-band relays is important in some NR deployment scenarios, it is very important to understand requirements of in-band operations involving close interworking with access links operating at the same frequency to accept duplex restrictions and avoid/relax interference.

Furthermore, when an NR system is operated in a millimeter wave spectrum, there are some unique problems, including experiencing severe short-term blocking that may not be easily mitigated by a current RRC-based handover mechanism due to a larger time scale required to complete a procedure compared to short blocking. Overcoming short blocking in millimeter wave systems may require a fast RAN-based mechanism for switching between rTRPs that do not necessarily require the inclusion of core networks. The aforementioned demand for easier deployment of self-backhauled NR cells and mitigation of short blocking for NR behavior in the millimeter wave spectrum raise a demand for the development of an integrated framework that allows fast switching of access and backhaul links. Over-the-air (OTA) coordination between rTRPs may also be considered as mitigating interference and supporting end-to-end path selection and optimization.

The following requirements and aspects should be addressed by the IAB for NR:

efficient and flexible behavior for in-band and out-band relay in indoor and outdoor scenarios;

multi-hop and redundant connectivity;

selection and optimization of end-to-end path support for backhaul links with high spectral efficiency; and support for legacy NR terminals.

A legacy NR is designed to support half-duplex devices. Accordingly, half duplex may be supported and worthy of being a target in an IAB scenario. Furthermore, IAB devices with full duplex may also be considered.

Figure 9A:
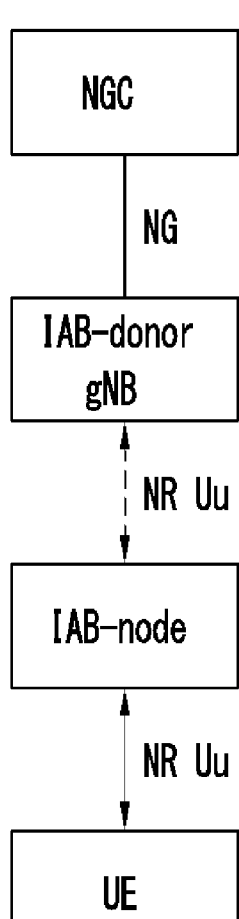
FIG. 9A illustrates examples of operations of a UE and an IAB node when NGC is considered in the SA mode.
Figure 9B:
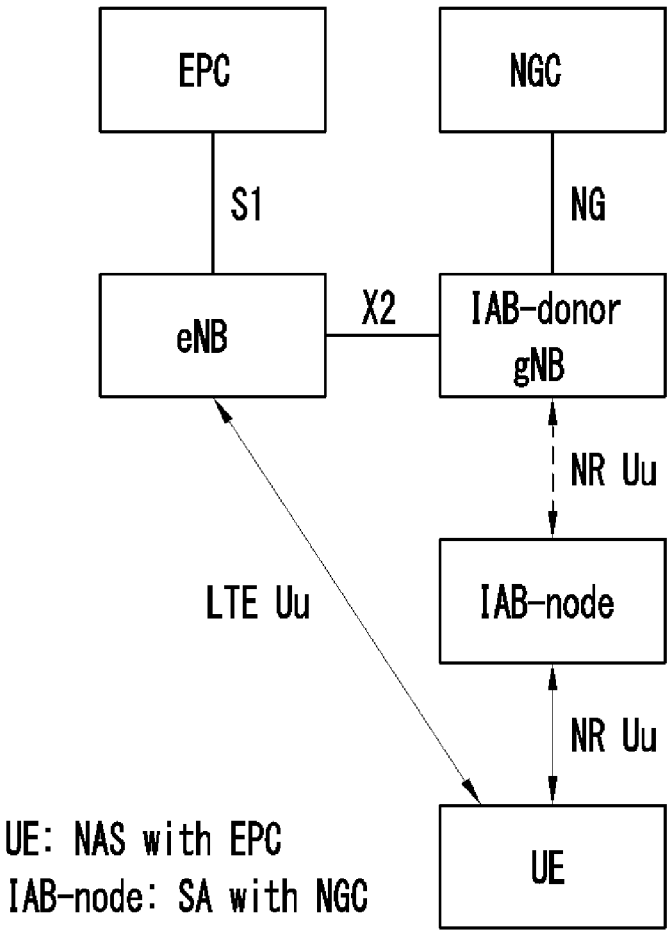
FIG. 9B illustrates examples of an operation of the IAB node when NGC is considered in the SA mode and an operation of the UE when EPC is considered in the NSA mode.
Figure 9C:
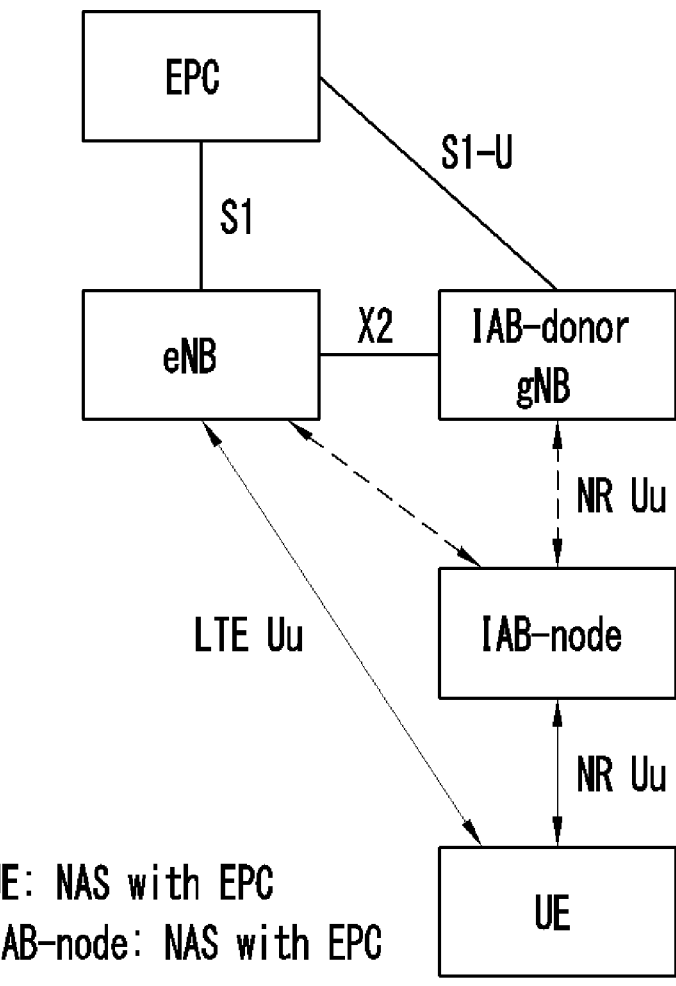
FIG. 9C illustrates examples of operations of the UE and the IAB node when EPC is considered in the NSA mode.

FIGS. 9A to 9C illustrate an example of an operation of an IAB system in a standalone (SA) mode and a non-standalone (NSA) mode. Specifically, FIG. 9A illustrates examples of operations of a UE and an IAB node when NGC is considered in the SA mode, FIG. 9B illustrates examples of an operation of the IAB node when NGC is considered in the SA mode and an operation of the UE when EPC is considered in the NSA mode, and FIG. 9C illustrates examples of operations of the UE and the IAB node when EPC is considered in the NSA mode.

The IAB node may operate in the SA mode or the NSA mode. When operating in the NSA mode, the IAB node uses only an NR link for backhauling. The UE connected to the IAB node may select an operation mode different from that of the IAB node. The UE may further be connected to a core network of a different type from the IAB node connected thereto. In this case, (enhanced) dedicated core network ((e)DECOR) or slicing may be used for CN selection. The IAB node operating in the NSA mode may be connected to the same or different eNB(s). UEs operating in the NSA mode may be connected to an eNB that is the same as or different from IAB nodes to which the UEs are connected. FIGS. 9A to 9C illustrate an example in which NGC is considered in the SA mode and an example in which EPC is considered in the NSA mode.

In the IAB scenario, when each relay node (RN) does not have a scheduling capability, a donor gNB (DgNB) should schedule all links between a DgNB, related relay nodes, and UEs. In other words, the DgNB should make scheduling decisions for all links by collecting traffic information from all related relay nodes and thereafter inform each relay node of scheduling information.

In contrast, dispersed scheduling may be performed when each relay node has a scheduling capability. Therefore, immediate scheduling can be performed in response to an uplink scheduling request from a UE, and backhaul/access links can be used more flexibly by reflecting a surrounding traffic situation.

Figure 10:
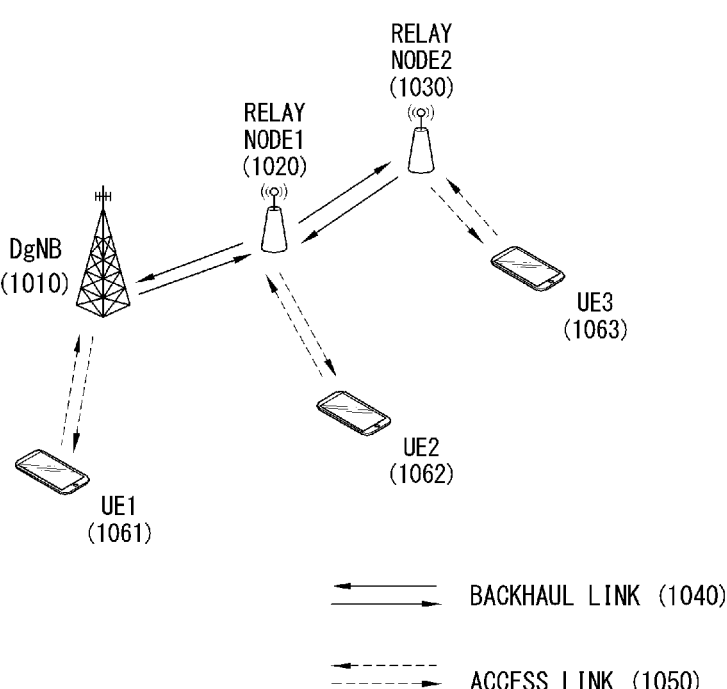
FIG. 10 schematically illustrates examples of configurations of access and backhaul links.

FIG. 10 schematically illustrates examples of configurations of access and backhaul links.

FIG. 10 illustrates an example in which a backhaul link and an access link are configured when there are a DgNB and an IAB relay node (RN). A backhaul link is connected between the DgNB and a relay node 1 and a backhaul link is connected between the relay node 1 and a relay node 2.

Referring to FIG. 10, the DgNB receives a scheduling request not only from a UE 1 but also from a UE 2 and a UE 3. Thereafter, the DgNB makes a scheduling decision for two backhaul links and three access links, and informs of scheduling results. Therefore, such centralized scheduling includes a scheduling latency and thus causes a latency problem.

On the other hand, distributed scheduling may be performed when each relay node has a scheduling capability. Therefore, immediate scheduling can be performed in response to an uplink scheduling request from a UE, and backhaul/access links can be used more flexibly by reflecting a surrounding traffic situation.

Figure 11:
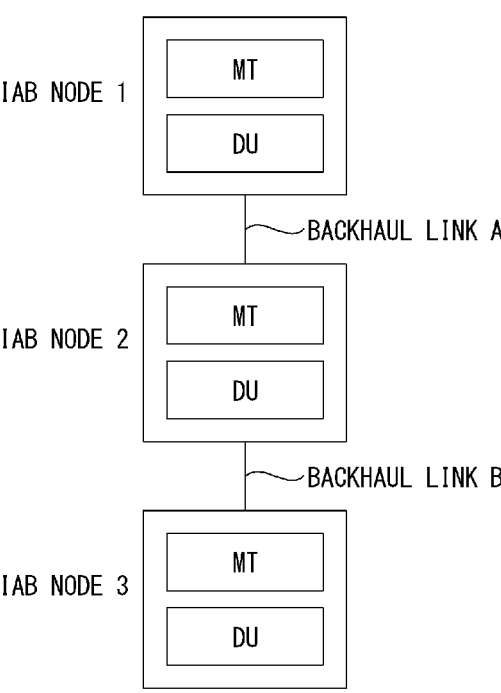
FIG. 11 illustrates links and relationships between IAB nodes.

FIG. 11 illustrates links and relationships between IAB nodes.

Referring to FIG. 11, an IAB node 1 is connected to an IAB node 2 through a backhaul link A. The IAB node 1 is a parent node of the IAB node 2 and the IAB node 2 is a child node of the IAB node 1 with respect to the backhaul link A. The IAB Node 2 is connected to an IAB Node 3 through a backhaul link B. The IAB Node 2 is a parent node of the IAB Node 3 and the IAB Node 3 is a child node of the IAB Node 2 with respect to the backhaul link B.

Here, each of these IAB nodes may perform two functions. One of the functions is mobile termination (MT) for maintaining a wireless backhaul connection to an upper IAB node or a donor node, and the other function is a distributed unit (DU) for providing access connections to UEs or connection to the MT of lower IAB nodes.

For example, in terms of the IAB node 2, the DU of the IAB node 2 functionally forms the backhaul link B with the MT of the IAB node 3, and at the same time, the MT of the IAB node 2 functionally forms the backhaul link A with the DU of the IAB node 1. Here, a child link of the DU of the IAB node 2 may be understood as the backhaul link B between the IAB node 2 and the IAB node 3. Here, a parent link of the MT of the IAB node 2 may be understood as the backhaul link A between the IAB node 2 and the IAB node 1.

Coverage is a basic aspect of cellular network deployment. A mobile communication provider relies on different types of network nodes to provide batch coverage during cellular network deployment. A deployment of general full stack cells is an option but may not always be viable (e.g., there is no backhaul availability) or may not be economically viable.

A relay node may be used as one coverage improvement method. A relay node may receive a signal from a base station or a transmission and reception point (TRP) and transmit the signal to a UE or may receive a signal from the UE and transmit the signal to the base stations or the TRP. A signal received by the relay node may be amplified or beamformed and thereafter transmitted back to a counterpart node, and the coverage of the signal may be expanded. Relay nodes may be classified into various types of relay nodes according to functions thereof. Through an amplifier-and-forward (AF) relay, a received signal may be simply amplified and transmitted back. The AF relay may be referred to as a layer 1 (L1) relay, a repeater, or the like. Through a decode-and-forward (DF) relay, a received signal may be decoded to receive data, encoded again, and transmitted. The DF relay may include a layer 2 (L2) relay, a layer 3 (L3)

relay, and the like. An integrated access and backhaul (IAB) node may be classified as the L3 relay according to a function thereof.

Among the types of relay nodes listed above, a repeater has a simple structure and operation and thus may be manufactured at a low cost and provide a high effect compared to invested costs. In general, in the case of a basic type of repeater, there is no need to distinguish between an uplink and a downlink, and a beamforming operation may not be performed. However, in order to maximize a coverage expansion effect, it may be desirable for a repeater to support the beamforming operation.

As a result, new types of network nodes have been considered to increase flexibility in building a network by mobile carriers. For example, an IAB has been introduced and new types of network nodes that do not need a wired backhaul have been developed. As another type of network node, there is a radio-frequency (RF) repeater that simply amplifies and delivers all received signals. The RF repeater has been deployed over a wide range of wireless communication systems to complement the coverage provided by a general full stack cell. In NR, RF and electromagnetic compatibility (EMC) requirements for RF repeaters for NR targeting both FR1 and FR2 have been specified.

RF repeaters offer cost-effective means for expanding network coverage but have limitations. RF repeaters simply perform amplify-and-forward (AF) operations without taking into account various factors that improve performance. These factors may include information about semi-static and/or dynamic downlink/uplink configuration, adaptive transceiver space beamforming, an ON-OFF state, and the like.

A network-controlled repeater (NCR) is an improvement of conventional RF repeaters with a function of receiving and processing side control information from a network. The side control information or auxiliary control information may allow the NCR to perform AF operations in a more efficient manner. Potential benefits of the NCR may include mitigation of unnecessary noise amplification, transmission and reception with better spatial orientation, and simplified network integration.

Figure 12:
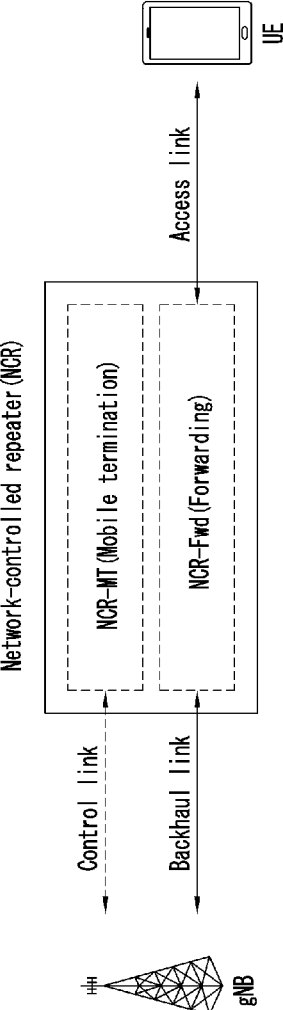
FIG. 12 illustrates an example of a conceptual model of a network control repeater.

FIG. 12 illustrates an example of a conceptual model of a network control repeater.

The network control repeater may be modeled as that of FIG. 12 including NCR-mobile termination (MT) and NCR-forwarding (Fwd). NCR-MT may be defined as a functional entity that communicates with a gNB through a control link (C-link) to enable the exchange of information (e.g., side control information for NCR-Fwd control). The C-link may be based on an NR Uu interface.

NCR-Fwd may be defined as a functional entity that performs an AF operation of a UL/DL RF signal between a gNB and a UE through a backhaul link and an access link. An operation of NCR-Fwd may be controlled according to side control information received from the gNB.

Meanwhile, an intelligent reflecting surface (IRS) has attracted attention as a relay node performing functions similar to those of a repeater. The IRS is a planar surface with passive elements formed of a metamaterial (hereinafter referred to as IRS elements), in which a phase of a received signal is changed by the IRS elements to form beams in a desired shape and reflect or pass a received signal to which the formed beams are applied. A phase shift of each IRS element may be independently controlled by a base station or TRP. In the present disclosure, the above-described beamforming operation may be referred to as reflection beamforming. The formed beam may be referred to as a reflection beam. Some IRSs may pass a signal instead of reflecting the signal. In this case, the signal may pass through each IRS element of the IRS and undergo a phase change, thus forming a beam, and this process may be referred to as transmissive beamforming. The formed beam may be referred to as a transmissive beam. Hereinafter, reflection beamforming and transmissive beamforming will be referred to collectively as reflection beamforming, and a reflection beam and a transmissive beam will be referred to collectively as a reflection beam. Similar to a repeater, the IRS has a simple structure and operation to provide a relay function of performing beamforming and thus may be used for purposes similar to those of the repeater. The IRS may also be referred to as a reconfigurable intelligent surface (RIS) or the like.

Figure 13:
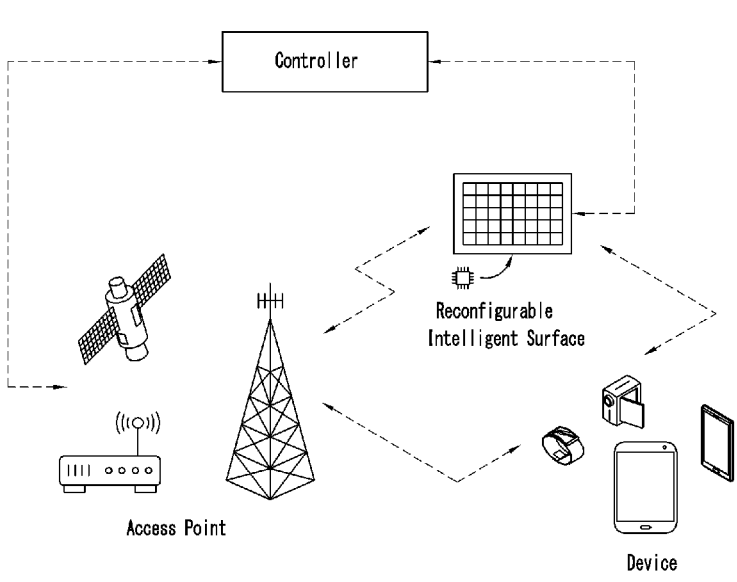
FIG. 13 is a diagram illustrating an example of an RIS.

FIG. 13 is a diagram illustrating an example of an RIS.

The RIS is a new network node consisting of a number of sub-wavelength scattering elements called unit cells. A response of the RIS may be dynamically controlled through control signaling for tuning a radio signal incident through reflection, refraction, focusing, collimation, modulation, or a combination thereof. Referring to FIG. 13, the RIS is a new network node dynamically configured by an RIS controller, and converts a wireless environment from a passive environment to an intelligent agent to program a channel.

In addition, the RIS does not require expensive active parts such as a power amplifier and may be generally implemented using passive parts, thus reducing implementation costs and energy consumption. Thus, the easiness and flexibility of deployment of the RIS may be allowed, together with a possibility that the RIS will take any shape and be integrated into an object (e.g., a wall, a building, a streetlight, or a pillar). Generally, the RIS is passive and hardly increases exposure to electromagnetic waves, and can actually be potentially used to reduce electromagnetic contamination in legacy deployment. Characteristics related thereto suggest that the RIS can be considered a sustainable eco-friendly technology solution, and various structures of RISs have been proposed considering costs, a form factor, design and integration as important factors.

Hereinafter, various technical features proposed in the present disclosure will be described. The technical features described below may be applied in a combined manner within a range in which they are not contrary to each other.

The technical features described below will be described on the basis of an NR system but are applicable to existing wireless communication systems, such as next-generation wireless communication systems or LTE, in addition to the NR system. For example, base stations may include a gNB and an eNB in relation to the technical features to be described below.

In addition, the technical features described below will be described with respect to new types of repeaters or relays such as NCR and RIS but are applicable to IAB nodes, UEs, and communication devices capable of performing a relay function, and the like. In addition, for convenience of description, the term such as "new type of repeater" or "relay" may be used in place of "relay."

Hereinafter, technical features proposed in the present disclosure and drawings for describing the technical features will be described. Each of the drawings to be described below is an example, and the technical features proposed herein are not limited thereby. In addition, it will be obvious to those of ordinary skill in the art that at least two of various technical features described below can be combined within a compatible range and thus technical features derived from such a combination also correspond to the present disclosure.

Figure 14:
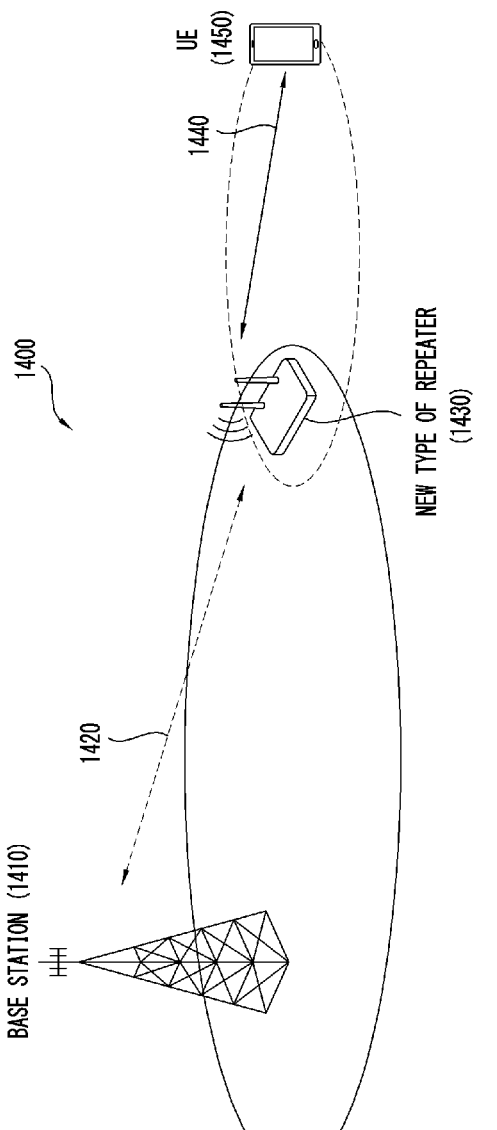
FIG. 14 illustrates a wireless communication system based on a new type of repeater.

FIG. 14 illustrates a wireless communication system based on a new type of repeater.

Referring to FIG. 14, a wireless communication system 1400 includes a base station 1410, a new type of repeater 1430, and a UE 1450. The new type of repeater 1430 may be a relay, a remote unit (RU), an ORAN-RU (O-RU), or a UE. The new type of repeater 1430 may include a functional structure as shown in FIG. 12.

For example, when the new type of repeater 1430 is a UE, the new type of repeater 1430 may include or perform a device-to-device (D2D) function or a sidelink function. Here, the side link may be understood as a new communication paradigm in which a cellular device may establish communication without relaying data through a network. That is, automobiles, robots, and consumer devices may generate ad-hoc networks thereof without using a wireless access network as an intermediary.

For example, a new type of repeater may perform a function of receiving data from a base station and transmitting the data to a UE. In addition, the new type of repeater may receive a control signal from a base station, and reflect/perform a corresponding control operation, i.e., an operation indicated by the control signal, on data to be transmitted to the UE.

For example, in FIG. 14, a link 1420 may denote a communication link between a base station and a new type of repeater, and a link 1440 may denote a communication link between the new type of repeater and a UE. Here, the link 1420 may be a backhaul link. The link 1440 may be an access link.

Figure 15:
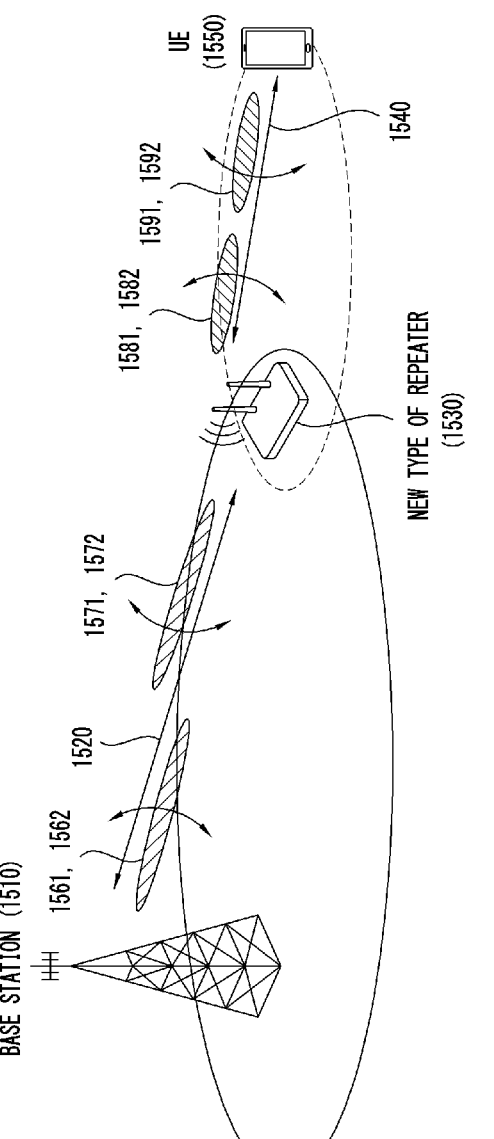
FIG. 15 illustrates an example of beamforming, phase shift or reflection of a signal according to the capability of a new type of repeater.

FIG. 15 illustrates an example of beamforming, phase shift or reflection of a signal according to the capability of a new type of repeater. In the present disclosure, a beamforming operation may include operations such as phase shift or reflection of a signal or a beam.

One example in relation to FIG. 15 will be described below. The technical features of the present disclosure are not limited to examples described below.

For example, with respect to a communication link between a base station and a new type of repeater (e.g., the communication link 1420 of FIG. 14), an operation 1561 in FIG. 15 may denote a transmission beam or transmission beamforming operation of the base station, and an operation 1562 in FIG. 15 may denote a reception beam or reception beamforming operation of the base station.

For example, with respect to the communication link between the base station and the new type of repeater (e.g., the communication link 1420 of FIG. 14), an operation 1571 in FIG. 15 may denote a reception beam or reception beamforming operation of the new type of repeater, and an operation 1572 in FIG. 15 may denote a transmission beam or transmission beamforming operation of the new type of repeater.

For example, with respect to a communication link between the new type of repeater and a UE (e.g., the communication link 1440 of FIG. 14), an operation 1581 in FIG. 15 may denote a transmission beam or transmission beamforming operation of the new type of repeater, and an operation 1582 in FIG. 15 may denote a reception beam or reception beamforming operation of the new type of repeater.

For example, with respect to the communication link between the new type of repeater and the UE (e.g., the communication link 1440 of FIG. 14), an operation 1591 in FIG. 15 may denote a reception beam or reception beamforming operation of the UE, and an operation 1592 in FIG. 15 may denote a transmission beam or transmission beamforming operation of the UE.

FIG. 16 illustrates examples of a flow of transmission of a signal from a base station to a UE and a structure of a new type of repeater.

Referring to FIG. 16, the new type of repeater may form a communication link 1620 with a base station 1610, which is an upper node, through a first communication unit 1631. Here, the communication link 1620 may be identical to the communication link 1420 of FIG. 14 and/or the communication link 1520 of FIG. 15.

Here, the first communication unit 1631 may include a transmission/reception terminal for communication with the base station 1610.

Referring to FIG. 16, the new type of repeater may form a communication link 1640 with a UE 1650, which is a lower node, through a second communication unit 1632. Here, the communication link 1640 may be identical to the communication link 1440 of FIG. 14 and/or the communication link 1540 of FIG. 15.

Here, the second communication unit 1632 may include a transmission/reception terminal for communication with the UE.

Referring to FIG. 16, an operation of the second communication unit 1632 may be controlled by the base station. That is, the second communication unit 1632 included in the new type of repeater may perform a corresponding operation, e.g., an operation indicated by the control of the base station.

Here, the control/control information of the base station may be indicated/received through the first communication unit 1631.

In other words, in relation to the example of FIG. 16, the new type of repeater may perform at least some of an MT function and a DU function of an IAB node. That is, the new type of repeater may include an MT that performs a function of a UE and a DU that performs a function of a base station, similar to an IAB node. Here, an antenna of the MT may be understood as an independent set of arrays or the same antenna used for access. Therefore, the new type of repeater may connect the communication link 1420 of FIG. 14, the communication link 1520 of FIG. 15, and/or the communication link 1620 of FIG. 16 with the base station through the MT. In addition, the new type of repeater may connect the communication link 1440 of FIG. 14, the communication link 1540 of FIG. 15, and/or the communication link 1640 of FIG. 16 with the UE through the DU.

In the present disclosure, the first and second communication units 1631 and 1632 of the new type of repeater of FIG. 16 may be functionally or physically distinguished from each other. For example, the first communication unit 1631 communicating with an upper node may perform at least some of the functions of the MT, and the second communication unit 1632 communicating with a lower node may perform at least some of the functions of the DU. In some embodiments, an object that performs a function of a UE may be referred to as a modified MT when the new type of repeater performs the function of the UE, and an object that performs a function of a base station may be referred to as a modified DU when the new type of repeater performs the function of the base station.

Figure 17:
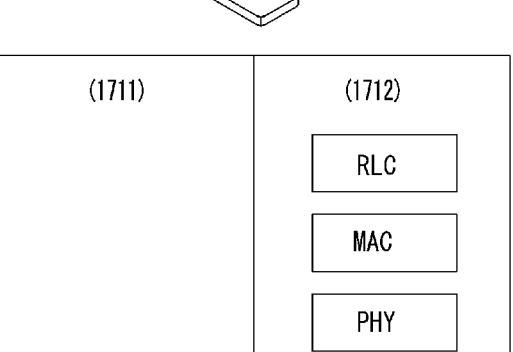
FIG. 17 illustrates a protocol stack of a DU of a new type of repeater.

FIG. 17 illustrates a protocol stack of a modified DU (e.g., the second communication unit 1632 of FIG. 16) of a new type of repeater. Technical features to be described below may be applied to a protocol stack of the new type of repeater.

For example, the modified DU may include only a PHY layer.

Here, the PHY layer may include only a radio-frequency (RF) terminal. In this case, the DU may only process and transmit/receive analog signals.

For example, the modified DU may include only the PHY layer and a MAC layer.

For example, the modified DU may include only the PHY layer, the MAC layer, and an RLC layer.

In relation to beamforming, a wavelength decreases at millimeter waves (mmW), thus allowing multiple antenna elements to be installed in the same area. That is, a wavelength at a 30 GHz band may be 1 cm, and a total of 100 antenna elements can be installed on a 5-by-5 cm panel in the form of a two-dimensional array at intervals of 0.5 wavelengths. Therefore, multiple antenna elements may be used at mmW to increase a beamforming (BF) gain to increase coverage or increase a throughput.

In this case, beamforming may be independently performed in units of frequency resources by providing a transceiver unit TXRU to adjust transmission power and a phase for each antenna element. However, it is ineffective in terms of costs when a TXRU is installed for all 100 antenna elements. Therefore, a method of mapping multiple antenna elements to one TXRU and adjusting a direction of a beam with an analog phase shifter is being considered. Such an analog beamforming method is disadvantageous in that frequency selective beamforming cannot be performed because it is possible to set only one beam direction in all bands.

Hybrid beamforming (BF), which is an intermediate form of digital BF and analog BF and includes B TXRUs, the number of which is less than that of Q antenna elements, may be considered. In this case, the number of directions in which beams are simultaneously transmitted is limited to B or less but may vary according to connection methods of B TXRUs and Q antenna elements.

A hybrid beamforming technique that is a combination of digital BF and analog BF for when multiple antennas are used in an NR system is emerging. In this case, analog BF (or RF BF) is advantageous in that precoding (or combining) is performed at an RF terminal to achieve performance similar to that of digital BF while reducing the number of RF chains and the number of D/A (or A/D) converters. For convenience of description, a hybrid beamforming structure may be represented by N TXRUs and M physical antennas. Therefore, digital BF for L data layers to be transmitted at a transmitting side may be represented by an N-by-L matrix, N digital signals obtained by conversion are converted into analog signals through the TXRUs, and analog BF represented by an M-by-N matrix is applied to the analog signals.

Figure 18:
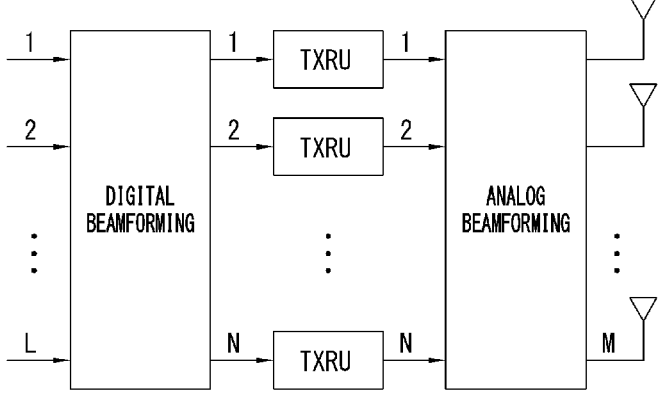
FIG. 18 is an abstract schematic diagram of a hybrid beamforming structure in view of the TXRU and a physical antenna.

FIG. 18 is an abstract schematic diagram of a hybrid beamforming structure in view of the TXRU and a physical antenna.

In FIG. 18, the number of digital beams is L, and the number of analog beams is N. Furthermore, an NR system is designed such that analog beamforming may be changed in units of symbols by a base station to more efficiently support beamforming to UEs located in a specific area. Furthermore, in FIG. 17, the introduction of a plurality of antenna panels to which independent hybrid beamforming is applicable when N specific TXRUs and M RF antennas are defined together as one antenna panel has been considered in the NY system.

As described above, when multiple analog beams are used in a base station, analog beams advantageous for signal reception may differ for each UE, and thus beam sweeping for changing multiple analog beams, which are to be applied to specific subframes by the base station, in units of symbols with respect to at least a synchronization signal, system information, paging, and the like has been considered to allow all UEs to have an opportunity to receive the analog beams.

Hereinafter, a beam management method will be described.

A channel through which a symbol of one antenna port has gone can be estimated or inferred from a channel through which another symbol of the antenna port has gone.

Quasi co-location (QCL) of two different types of antenna ports may be understood to mean that large-scale characteristics of a channel through which a symbol transmitted from one antenna port has gone can be estimated or inferred from a channel through which a symbol transmitted by another antenna port has gone. The large-scale characteristics of the channel may be understood to include at least one among "delay spread," "Doppler spread," "Doppler shift," "average gain," "average delay," and "spatial Rx parameters."

Information about the QCL may be used to improve channel measurement performance of a UE by providing the UE with information about a signal (QCL reference RS) having large-scale characteristics reusable for the reception of a signal (QCL target RS) (i.e., having sufficient time/frequency resources), when large-scale characteristics of a channel cannot be accurately measured from the signal (QCL target RS) due to insufficient time/frequency resources of the signal.

In the case of NR, various QCL types are supported as follows:

QCL-TypeA: including {Doppler shift, Doppler spread, average delay, delay spread};

QCL-TypeB: including {Doppler shift, Doppler spread};

QCL-TypeC: including {Doppler shift, average delay}; and

QCL-TypeD: including {Spatial Rx parameter}.

Figure 19:
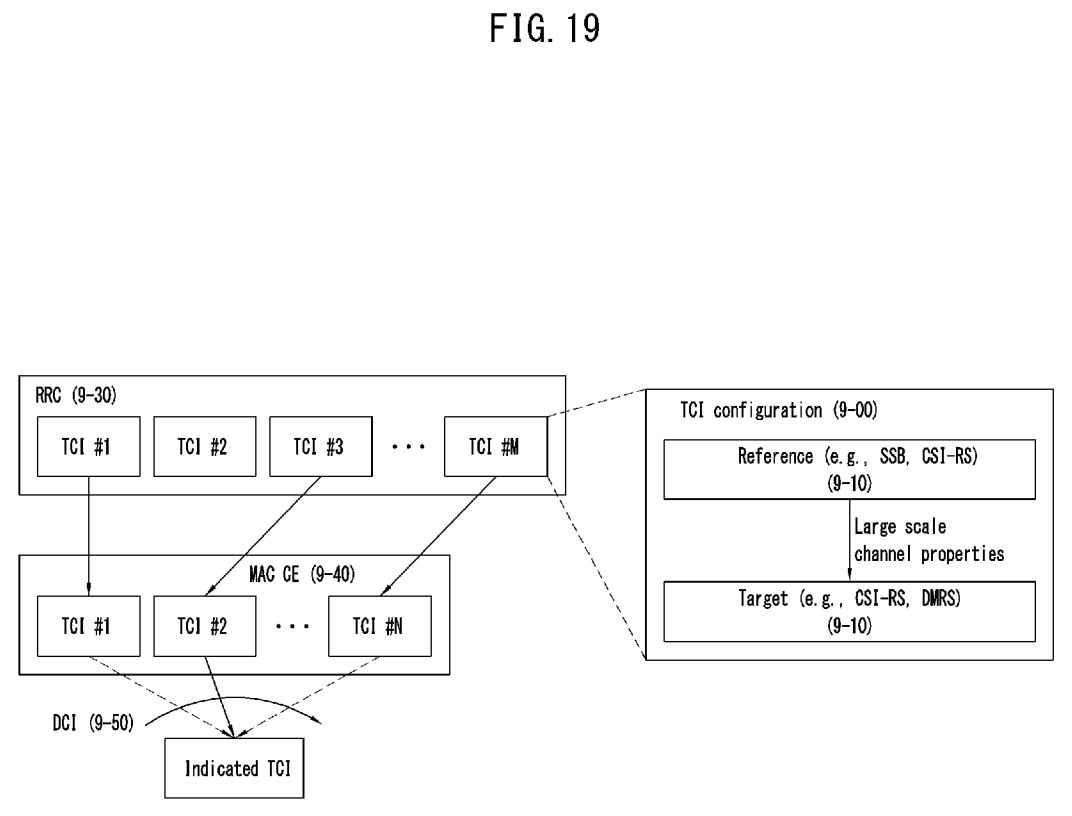

FIG. 19 is a diagram illustrating an example of a structure of transmitting QCL information by setting and indicating a transmission configuration information (TCI) state.

Referring to FIG. 19, the base station may set up to M TCI states for a UE with respect to upper layers (RRC) according to a UE capability report and a maximum value defined according to a standard (e.g., 4, 8, 64, 128 or the like according to a frequency band) (9-30). In this case, each TCI state configuration (9-00) includes information about a signal or channel (QCL reference, 9-10) that provides large-scale channel characteristics to a signal or channel (QCL target, 9-20) referring to corresponding TCI. One TCI state configuration (9-00) may include up to two references (i.e., qcl-Type1 and qcl-Type2). The first reference may be QCL-TypeA, QCL-TypeB, or QCL-TypeC (i.e., qcl-Type1∈{QCL-TypeA, QCL-TypeB, QCL-TypeC}), and the second reference may be QCL-TypeD (i.e., qcl-Type2=QCL-TypeD) when the second reference exists.

UE implementation complexity increases greatly when all pieces of TCI for which RCC is set are applied in real time, and thus the base station may transmit an activation message for some of the pieces of RRC-set TCI to a UE through L2 signaling such as MAC CE (9-40). The base station may activate up to N (<M) pieces of TCI, and the UE may be given a dynamic indication only for the activated pieces of TCI.

Thereafter, the base station may dynamically indicate some of the N pieces of activated TCI to the UE through L1 signaling such as DCI (9-50). After receiving the TCI through L1 signaling, the UE may apply a piece of QCL information (or pieces of QCL information) indicated by the TCI and perform a reception operation on a corresponding signal or channel at a predetermined timing.

In FIG. 19, some of TCI state indicating operations, including "RRC (9-30)," "MAC CE (9-40)," and "DCI(9-50)," may be omitted according to the type of a QCL target RS. For example, when a QCL target is a PDSCH DMRS and one or more TCI states are RRC-set, the base station may indicate a TCI state using all of the operations of FIG. 19 but when the QCL target is a PDSCH DMRS and a single TCI state is RRC-set, MAC CE signaling (9-40) to DCI signaling (9-50) may be omitted. Similarly, when the QCL target is a PDCCH DMRS, DCI signaling (9-40) may be omitted.

The base station may instruct the UE to activate or deactivate some of RRC-set TCI states through MAC CE signaling or to apply a TCI state indicated by a MAC CE to a QCL target RS. For example, the base station may use the following MAC CE signaling according to the type of the QCL target RS:

TCI state activation/deactivation MAC CE for UE-specific PDSCH DMRS;

TCI state indication MAC CE for UE-specific PDCCH DMRS; or

TCI state activation/deactivation MAC CE for enhanced UE-specific PDSCH DMRS.

The base station may set spatial relation information as an upper layer for the UE to indicate uplink beam information. The spatial relation information is an agreed signaling structure for using a spatial domain filter value, which was used to transmit or receive an RS, for a spatial TX filter for uplink transmission of a target RS of a corresponding spatial relation. The RS of the spatial relation may be a downlink signal such as a synchronization signal block (SSB) or a channel state information-reference signal (CSI-RS) or may be set to an uplink signal such as a sounding reference signal (SRS). When the RS is a downlink signal, the UE may use a spatial RX filter value, which was used to receive the RS, for a spatial TX filter for transmission of a corresponding spatial relation target RS. When the RS is an uplink signal, the UE may use a spatial RX filter value, which was used to receive the RS, for a spatial TX filter for transmission of a corresponding spatial relation target RS.

For example, a method of managing or indicating a transmission/reception beam for the link 1640 between a new type of repeater 1630 and the UE 1650 is proposed. Here, a beam may be configured differently for each time, frequency, or TRP.

For example, the base station 1610 may indicate transmission/reception beam information regarding the link 1640 between the new type of repeater 1630 and the UE 1650 to the new type of repeater 1630.

As another example, the base station may indicate beam information through F1 application protocol (F1AP)/transmission control protocol (TCP)/operation administration maintenance (OAM)/radio resource control (RRC)/medium access control-control element (MAC-CE)/downlink control information (DCI). Here, a method of indicating beam information may be determined on the basis of a structure of the new type of repeater 1630 or a protocol stack.

Here, a plurality of pieces of beam information may be transmitted through different signaling. For example, second beam information may be provided through MAC-CE and/ or DCI to a UE/new type of repeater that has received first beam information through RRC signaling. Here, for example, the second beam information may be applied when the second beam information is provided to a UE/new type of repeater, which has received the first beam information through RRC signaling, through MAC-CE, and the first beam information may be applied when second beam information is not provided.

As another example, beam information may be configured in conjunction with transmission/reception scheduling (or resource allocation) information of the new type of repeater 1630 for the link 1640 between the new type of repeater 1630 and the UE 1650. For example, when the new type of repeater performs a transmission or reception operation scheduled according to the scheduling information, the new type of repeater may use a transmission beam or reception beam indicated by the beam information.

Here, the scheduling information may include information about at least one of a time, a frequency, and a TRP. For example, the scheduling information may inform that a signal is to be transmitted in a specific time-frequency resource to the UE from the new type of repeater or is to be received in a specific time-frequency resource from the UE.

For example, the scheduling information may be configured per time unit (e.g., per symbol), similar to DCI format 2_5. Here, DCI format 2_5 may be used to inform of availability of soft type resources of an IAB node. In DCI format 2_5, a cyclic redundancy check (CRC) bit may be scrambled with an availability indication-radio network temporary identifier (AI-RNTI), and may include an availability indicator 1 to an availability indicator N.

In addition, beam information may be configured for each piece of scheduling information.

For example, a method of mapping a scheduling information ID and a beam information ID may be used.

As another example, scheduling information may be configured on the basis of a manner in which beam information is included in the scheduling information.

The scheduling information may be transmitted in F1AP/TCP/OAM/RRC/MAC-CE/DCI.

In addition, the scheduling information may include mapping information indicating a point in time when the new type of repeater will transmit data transmitted from the base station to the UE. Conversely, the scheduling information may include mapping information indicating a point in time when data transmitted from the UE to the new type of repeater will be transmitted to the base station from the new type of repeater.

For example, the scheduling information may include mapping information indicating that data transmitted from the base station to the new type of repeater in a slot #n is to be transmitted from the new type of repeater to the UE in a slot #(n+8). In this case, the new type of repeater may store the data in a buffer and transmit the data to the UE in the slot #(n+8). Meanwhile, the interval between slots is only one example and thus the technical features of the present disclosure are not limited thereto. That is, a time difference or offset between the slot in which the data is transmitted and the slot in which the scheduling information including the mapping information is transmitted may be set by the base station, determined in advance, or defined on the basis of the capability of the UE. The time difference or offset may be set in units of slots, symbols, or other time resources.

As another example, the scheduling information may be configured with respect to the new type of repeater by mapping a scheduling information ID for a link between the base station and the repeater and a scheduling information ID for a link between the repeater and the UE to each other. For example, when the scheduling information ID for the link between the base station and the new type of repeater is a first scheduling information ID, the scheduling information ID for the link between the repeater and the UE is a second scheduling information ID, and the repeater receives a plurality of second scheduling information IDs, a mapping relation representing an ID based on which data received from the base station on the basis of the first scheduling information ID is to be transmitted to the UE from the repeater among the plurality of second scheduling information IDs may be required.

A configuration method of beam information will be proposed below.

For example, beam information may be configured on the basis of TCI state ID.

Here, scheduling information ID may be included in TCI state information. Accordingly, beam information may be configured to be mapped for each piece of scheduling information.

As another example, the beam information may be configured as a resource ID of a resource set.

Here, the resource set may include a reference signal RS. In a wireless communication system, data is transmitted through a wireless channel and thus a signal may be distorted during transmission. The distortion of a received signal should be fixed using channel information, so that the distorted signal may be accurately received by a receiving side. Generally, in order to detect channel information, a signal transmission method known to both a transmitting side and the receiving side and a method of detecting the channel information according to a degree of the distortion of a signal when the signal is transmitted through a channel are used. The above-described signal is referred to as a pilot signal or a reference signal (RS).

Here, the reference signal may be a reference signal for the link between the new type of reference signal and the UE, and examples thereof may include an SSB, a CSI-RS, an SRS, and a positioning reference signal (PRS).

Alternatively, the reference signal may be a reference signal for the link between the base station and the new type of repeater, and the new type of repeater may implicitly interpret a beam of the link between the repeater and the UE in conjunction with the reference signal for the link between the repeater and the base station (beam pairing or beam correspondence).

As another example, the beam information may be configured as an operation administration maintenance (OAM). For example, the beam information may be information defined in advance and stored in a memory of the new type of repeater or the like.

For example, a predetermined operation mode, e.g., a mode 1 or a mode 2, may be configured internally.

Here, the mode may represent a specific beam shape.

For example, the new type of repeater may perform one of the following procedures when there is no beam information for transmission or reception in relation to the link between the repeater and the UE due to instability of the link between the base station and the new type of repeater (e.g., a radio link failure (RLF) or a beam failure), i.e., when the repeater fails to receive beam information about a beam to be used for the link between the repeater and the UE. Here, a procedure to be performed among the procedures may be determined by the system.

For example, the new type of repeater may maintain the form of a beam that has previously been operated.

As another example, the new type of repeater may change the beam to an omni-beam (omnidirectional beam).

As another example, a method of counteracting the instability of the link between the base station and the new type of repeater by the new type of repeater and the UE may be applied to behaviors/operations other than a beam configuration.

As another example, a transmission/reception procedure related to an SSB may be performed differently. In this case, a measurement and management method for the link between the new type of repeater and the UE to be described below may be used in the transmission/reception procedure related to the SSB.

For example, in order to prevent the performance of at least some of the procedures to be performed by the new type of repeater when the repeater fails to receive beam information about a beam to be used for the link between the repeater and the UE due to the instability of the link between the base station and the repeater, the base station may transmit beam information about the link between the repeater and the UE in advance until an expected recovery time (an expected recovery time will be referred to herein as T1) to fix the instability of the link between the repeater and the base station.

For example, the new type of repeater may have the capability of storing information until the time T1 in a buffer.

For example, an operation mode of the new type of repeater that is different from a transmission/reception beam management or indication method of the repeater for a link between the UE and the new type of repeater for a transmission/reception beam for the link between the repeater and the UE may be defined/applied.

For example, the transmission/reception beam for the link between the repeater and the UE may depend on the link between the repeater and the base station.

As another example, a reception operation of the repeater or a DU (e.g., the second communication unit 1632 of FIG. 16) of the repeater may be set to be performed for the link between the repeater and the UE with respect to a domain (e.g., a time, frequency, or TRP) in which transmission is performed by the repeater or an MT (e.g., the first communication unit 1631 of FIG. 16) of the repeater for the link between the repeater and the base station.

As another example, a transmission operation of the repeater or the DU (e.g., the second communication unit 1632 of FIG. 16) of the repeater may be set to be performed for the link between the repeater and the UE with respect to a domain (e.g., a time, frequency, or TRP) in which reception is performed by the repeater or the MT (e.g., the first communication unit 1631 of FIG. 16) of the repeater for the link between the repeater and the base station.

As another example, the following technical features may be applied by taking into account a processing time, e.g., processing times of the first and second communication units 1631 and 1632 of FIG. 16, and a time offset with respect to an operation of the repeater for the base station. Among methods described below, a time offset in a first method may be the same as or different from a time offset in a second method.

(First method) A transmission domain of a modified MT (e.g., the first communication unit 1631 in FIG. 16) of a new type of repeater may be defined as the sum of a reception domain of a modified DU (e.g., the second communication unit 1632 of FIG. 16) of the new type of repeater and a time offset.

(Second method) A reception domain of a modified MT (e.g., the first communication unit 1631 in FIG. 16) of a new type of repeater may be defined as the sum of a reception domain of a modified DU (e.g., the second communication unit 1632 of FIG. 16) of the new type of repeater and a time offset.

As another example, the time offset in the first method and the time offset in the second method may be set by the repeater and reported to the base station. Alternatively, the time offset in the first method and the time offset in the second method may be set by the base station and may be indicated to the repeater.

As another example, the base station may transmit beam information of the repeater, for the link between the repeater and the UE, which is mapped to a scheduling information ID of the link between the base station and the new type of repeater.

For example, an operation mode of the new type of repeater that is different from either a transmission/reception beam management or indication method of the repeater 1630 for the link 1640 between the new type of repeater 1630 and the UE 1650 with respect to a transmission/reception beam for the link between the repeater and the UE or a transmission/reception beam management or indication method of the repeater for the link between the new type of repeater and the UE may be defined/applied. For example, the new type of repeater may periodically perform a beam sweeping operation and report information related to the beam sweeping to the base station. The base station may transmit scheduling information about the repeater on the basis of the report.

For example, the new type of repeater may report an operation mode to the base station.

Here, a predetermined operation mode, e.g., a mode 1, a mode 2, . . . , a mode N, may be configured internally. For example, the operation information may be defined in advance and stored in the memory of the new type of repeater or the like.

As another example, the modes 1 to N may be rotationally applied to the repeater in units of slots or symbols with respect to a transmission/reception frame according to an instruction from the base station.

As another example, the base station may indicate the number of a starting/used mode at a specific point in time or the number of each mode to be excluded from among all the modes.

Here, the new type of repeater may start/apply a corresponding mode at a corresponding point in time among the modes 1 to N or rotatably apply the modes excluding a specific mode, based on the indication.

For example, the base station may transmit information related to a beam indication on the basis of the above-described examples. Here, the information related to the beam indication may be information related to at least one of a periodic beam indication, an aperiodic beam indication, or a semi-static beam indication. In this regard, information related to the beam indication may be transmitted in at least one of an RRC, an MAC-CE, and DCI. The beam indication may be understood as a beam indication for a beam between the new type of repeater and the UE. The information related to the beam indication may include a field indicating beam information and a field indicating a time resource. Here, the beam information may be information related to the beam indication. The field indicating the beam information may be a field indicating a beam index. The field indicating the beam information may be configured in connection with the field indicating the time resource. That is, the field indicating the beam information and the field indicating the time resource may be configured/interpreted in connection with each other.

Alternatively, a list of sets of beam information and time resources may be configured. Here, the list may be transmitted through RRC signaling, and a specific set may be activated/indicated through MAC-CE/DCI. In this case, the list may be configured for each beam indication type (e.g., periodic, aperiodic, semi-static, etc.). The information may include fields indicating a plurality of pieces of beam information and fields indicating a plurality of time resources. In this case, the number of the fields indicating the plurality of pieces of beam information may be the same as the number of the fields indicating the plurality of time resources. For example, each of the fields indicating the plurality of pieces of beam information may be mapped to one of the fields indicating the time resources.

In addition, the base station may transmit information for interpreting/identifying the information related to the beam indication to the new type of repeater/UE. For example, the base station may transmit information about the length of the field indicating the beam information in a message (or information related to the beam indication) to the new type of repeater/UE.

The message in which the information related to the beam indication is transmitted may be different from a message in which information indicating a time resource is transmitted. For example, the base station may transmit the information indicating the time resource to the new type of repeater and/or the UE through RRC signaling, and transmit beam indication information through DCI. In addition, the base station may transmit information indicating time resources for a periodic/semi-static/aperiodic beam indication to the new type of repeater and/or the UE through RRC signaling, and transmit aperiodic beam indication information through DCI.

Hereinafter, a method of counteracting the instability of a link between a base station and a new type of repeater by the new type of repeater and a UE will be proposed.

For example, when the link between the base station and the new type of repeater is unstable, the new type of repeater may form a specific signal.

Here, when the new type of repeater has already formed the specific signal, the new type of repeater may report this fact to the base station.

In addition, the base station may form a specific signal and transmit the specific signal to the new type of repeater. The new type of repeater may store the specific signal.

As another example, the base station may transmit a specific signal to the UE through the new type of repeater. The UE may identify the specific signal. That is, based on the received specific signal, the UE may identify the instability of a link between the base station and the new type of repeater.

As another example, when the link between the base station and the new type of repeater is unstable (e.g., a beam failure, a radio link failure (RLF) or the like), the following technical features may be applied.

Here, in relation to the beam failure, a beam failure event may occur when the quality of a beam pair link of an associated control channel is sufficiently low (e.g., when compared with a threshold, in the case of a timeout of an associated timer, or the like). A mechanism for fixing a beam failure (or fault) may be triggered when a beam failure occurs.

A network may be explicitly configured for a UE having a resource for transmitting an uplink signal for a recovery purpose. A configuration of resources may be supported in regions (e.g., a random access region) in which the base station performs listening from all or some directions.

An uplink transmission/resource for reporting a beam failure may be provided at the same time instance as a PRACH (resource orthogonal to a PRACH resource) or at a different time instance (configurable for the UE) from the PRACH. Transmission of a downlink signal may support the UE in monitoring a beam to identify new potential beams.

Beam management may be supported regardless of a beam-related indication. When the beam-related indication is provided, information about a UE beam formation/reception procedure used for CSI-RS-based measurement may be indicated to the UE through QCL. Examples of supportable QCL parameters may include not only parameters related to a delay, Doppler, an average gain, etc., but also spatial parameters for beamforming of a receiving side, and include angle-of-arrival (AoA)-related parameters in terms of UE reception beamforming and/or angle-of-departure (AoD)-related parameters in terms of base station reception beamforming. In addition, the use of the same or different beams may be supported for the transmission of a control channel and a corresponding data channel.

For the transmission of a PDCCH that supports robustness for beam pair link blocking, the UE may be configured to monitor the PDCCH at M beam pair links at the same time. Here, M≥1 and a maximum value of M may depend on at least the capability of the UE.

The UE may be configured to monitor a PDCCH at different beam pair link(s) with respect to different PDCCH OFDM symbols. A parameter related to setting a reception beam of the UE for monitoring the PDCCH at multiple beam pair links may be configured by upper layer signaling or MAC CE and/or be considered in the design of a search space.

At least an indication of an assumption of a spatial QCL between downlink RS antenna port(s) and downlink RS antenna port(s) for demodulation of a downlink control channel may be supported. A candidate signaling method for an indication of a beam for the PDCCH (i.e., a configuration method of monitoring the PDCCH) may be a combination of MAC CE signaling, RRC signaling, DCI signaling, an implicit method, and a signaling method thereof.

To receive a unicast downlink data channel, an indication of an assumption of a spatial QCL between a downlink RS antenna port and a DMRS antenna port of a downlink data channel may be supported.

Information indicating an RS antenna port may be displayed through the DCI. The above information may represent an RS antenna port quasi co-located (QCL) with a DMRS antenna port. Different sets of DMRS antenna ports for a downlink data channel may be represented as being quasi co-located (QCL) with another set of RS antenna ports.

Here, the new type of repeater may transmit a specific signal to the UE.

In order to differentiate between a case or method in which the base station forms a specific signal and transmits the specific signal to the new type of repeater or the new type of repeater stores the specific signal and a case or method in which the new type of repeater transmits a specific signal to the UE due to the instability of the link between the base station and the new type of repeater (e.g., a beam failure, a radio link failure or the like) as a method of counteracting the instability of the link between the base station and the new type of repeater by the new type of repeater and the UE, these signals may be configured as different channels (e.g., different DCIs, different DCI formats or different layers). For example, a DCI format used for a specific signal in a case or method in which the base station forms the specific signal and transmits the specific signal to the new type of repeater or when the new type of repeater stores the specific signal as a method of counteracting the instability of the link between the base station and the new type of repeater by the new type of repeater and the UE may be different from that used for a specific signal in a case or method in which the new type of repeater transmits the specific signal to the UE due to the instability of the link between the base station and the new type of repeater (e.g., a beam failure, a radio link failure (RLF) or the like).

As another example, the UE may identify the reliability of the link between the new type of repeater and the UE upon receiving a specific signal and start monitoring a control channel (PDCCH). Here, for example, the monitoring of the control channel may be performed by the UE until the link between the base station and the repeater becomes stable. Alternatively, the monitoring of the control channel may be performed by the UE for a specific time period. Here, for example, when no control channel is detected by the monitoring of the control channel during the specific time period, the UE may declare an RLF and perform a recovery procedure. Meanwhile, the above operation may also be performed by the new type of repeater.

For example, when a beam failure between the base station and the new type of repeater is detected, the new type of repeater may start monitoring the control channel. Furthermore, in the present disclosure including the above example, the monitoring of the control channel performed based on a beam failure, link instability, or the like may be part of an operation to be described below. That is, when the beam failure, the link instability or the like is detected, the UE and/or the new type of repeater may perform a power saving operation, a power off operation, or a DRX operation or enter a power saving mode. Here, the monitoring of the control channel may be included in each of the operations. Here, the power-off operation may be a situation or operation in which only a minimal amount of power is maintained (power for monitoring or receiving control information or power for performing an operation).

Furthermore, the operation may be performed by the UE/new type of repeater on the basis of a connection state of the UE/new type of repeater. For example, when the UE/new type of repeater is in an RRC_IDLE state or an RRC_INACTIVE state, the UE/new type of repeater may perform the power saving operation, the power off operation, or the DRX operation or enter the power saving mode.

Alternatively, the operation may be performed by the UE/new type of repeater on the basis of whether a beam indication is given to the UE/new type of repeater. For example, when there is no beam instruction for the UE/new type of repeater, the UE/new type of repeater may perform the power saving operation, the power off operation, or the DRX operation or enter the power saving mode. Conversely, when there is a beam indication for the UE/new type of repeater, the UE/new type of repeater may perform a power-on operation, leave the power saving mode, or enter a general operation mode. In this case, whether there is a beam indication may be determined on the basis of various conditions (e.g., when there is no beam indication for a certain time period, when the number of beam indications is below a threshold value, or the like).

Hereinafter, a method of measuring and managing a link between a new type of repeater and a UE will be proposed.

For example, the base station may perform a measurement procedure for management of the link between the new type of repeater and the UE.

As another example, the base station may instruct the new type of repeater to report measurement results through F1AP/TCP/OAM/RRC/MAC-CE/DCI.

As another example, the new type of repeater may perform one of the following three procedures after receiving a signal transmitted from the UE for the measurement. The base station may instruct details of a procedure to the new type of repeater. The procedure may also be performed for a panel of the new type of repeater or in units of TRPs.

For example, the repeater may forward/transmit a reception signal.

Here, schedule mapping when a reception signal for the link between the new type of repeater and the UE is transmitted to the link between the base station and the new type of repeater may be configured/applied for forwarding of the reception signal, similar to a configuration method of scheduling information including mapping information regarding a point in time when the new type of repeater transmits data transmitted from the base station to the UE and/or a configuration method of scheduling information including mapping information regarding a point in time when the new type of repeater transmits data from the UE to the new type of repeater.

As another example, the new type of repeater may estimate/measure measurement values (e.g., RSRP, SINR, RSRQ, CQI, and beam information) for the reception signal, and transmit the estimated value. Here, the estimated values may be quantized and transmitted.

Here, the new type of repeater may transmit the estimated value to resources allocated in units of IDs according to the types of the measured values (e.g., RSRP, SINR, and RSRQ).

In addition, the new type of repeater may transmit the estimated value together with an ID according to the types of measurement values.

Here, the ID may be a scheduling information ID.

Alternatively, according to the types of the measurement values, multiplexing may be performed on the measurement values and a result value may be transmitted.

Here, multiplexing may be understood as representing an average value of the measurement values or measurement values, which are obtained by signal processing, as one value (muxing).

As another example, the new type of repeater may transmit only some estimated values according to a determination. The transmission method may be performed on the basis of a protocol stack configured for the new type of repeater.

Here, some of the estimated values may be a maximum value, a minimum value, an average value, and x upper or lower values for (the maximum value, the minimum value, and the average value). Here, x may be an integer greater than or equal to 2.

Some of the estimated values may be transmitted in a sub-method of the above technical feature 4.3.2.

Only IDs corresponding to the estimated values may be transmitted.

Hereinafter, an SSB transmission/physical random access channel (PRACH) reception procedure (e.g., when there is no beam information indication from the base station or the like) will be described.

Figure 20:
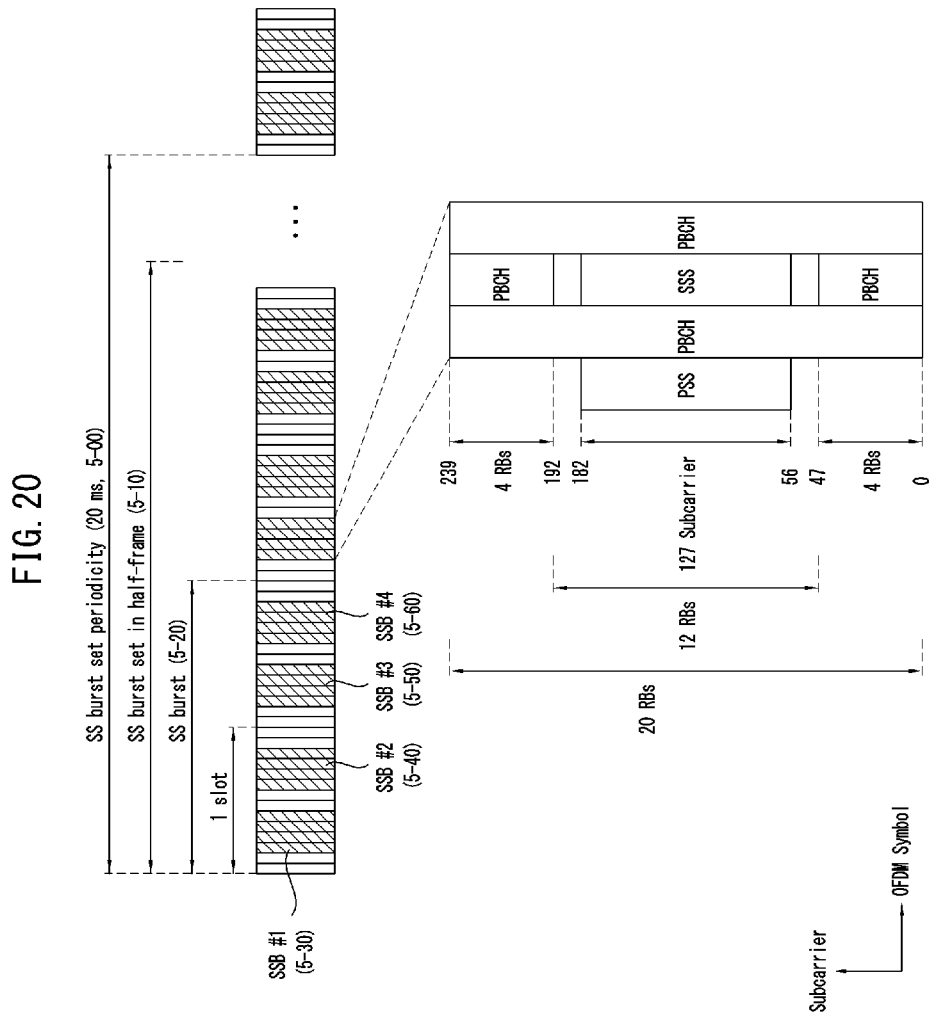
FIG. 20 is a diagram illustrating an example of a construction of an SS/PBCH block (synchronization signal and physical broadcast channel block (SSB)) of an NR system.

FIG. 20 is a diagram illustrating an example of a construction of an SS/PBCH block (synchronization signal and physical broadcast channel block (SSB)) of an NR system.

Referring to FIG. 20, one SSB includes a primary synchronization signal (PSS) transmitted from 127 subcarriers among first OFDM symbols, a secondary synchronization signal (SSS) transmitted from 127 subcarriers among third OFDM symbols, and a physical broadcast channel transmitted from second, third and fourth OFDM symbols. A PBCH occupying a largest band is transmitted over 20 RBs and is 3.6 MHz with respect to a 15 kHz SCS. The base station transmits one SSB by applying the same beam thereto, and multiple SSBs may be transmitted to support a multi-beam operation when it is necessary to operate multiple beams by applying one or more analog beams due to an increase in the number of base station antennas or to support high frequencies. The term "beam" may be used interchangeably with various terms, such as "transmission precoding and spatial transmission filter," when actually applied, but in the present disclosure, only the term "beam" will be used for clarity.

Figure 21:
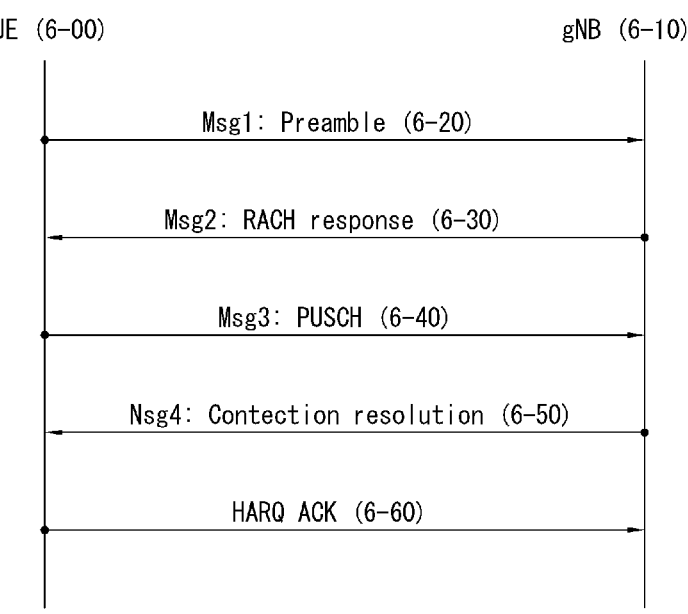
FIG. 21 is a diagram illustrating an example of a random access channel (RACH) procedure.

FIG. 21 is a diagram illustrating an example of a random access channel (RACH) procedure.

Before performing a RACH procedure such as that shown in FIG. 21, a UE may receive a PBCH to obtain system information or may receive and store some of the following information by RRC signaling:

physical random access channel (PRACH) preamble format;

time/frequency resource information for transmission of RACH;

index to logical root sequence table;

cyclic shift (NCS); and set type (unrestricted, restricted set A, restricted set B).

Referring to FIG. 21, as a first procedure, a UE 6-00 may transmit an RA-RNTI-based PRACH preamble to a base station (gNB) 6-10, which will be referred to herein as Msg1 (6-20). In this case, the RA-RNTI may be calculated according to Equation 1 below.

$$RA-RNTI = 1 + s\_id + 14 \times t\_id + \qquad \text{[Equation 1]}$$
$$14 \times 80 \times f\_id + 14 \times 80 \times 8 \times ul\_carrier\_id$$

In Equation 1 above, s_id denotes an index of a first OFDM symbol in a corresponding PRACH occasion ($0 \leq s\_id < 14$), t_id denotes the index of a first slot in the corresponding PRACH occasion in a system frame ($0 \leq t\_id < 80$), f_id denotes the index of the corresponding PRACH occasion on a frequency axis ($0 \leq f\_id < 8$), and ul_carrier_id denotes a value according to the type of an uplink carrier used for the transmission of a preamble (0 for a normal UL carrier, and 1 for a supplementary UL carrier).

As a second procedure, the gNB 6-10 may provide the UE 6-00 with a random access response (RAR), which will be referred to herein as Msg2. (6-30). The gNB 6-10 calculates the RA-RNTI on the basis of Equation 1 above and uses the RA-RNTI for scrambling to transmit downlink control information (DCI). The UE 6-00 monitors a PDCCH scrambled with the RA-RNTI in a section included in a RACH response window that is set as an upper layer (configured by ra-ResponseWindow) in a type 1 PDCCH common search space (CSS). When the UE 6-00 successfully decodes the PDCCH, the UE 6-00 may decode a PDSCH including RAR data. When the UE 6-00 successfully decodes the RAR, the UE 6-00 checks whether a RA preamble identifier (RAPID) in the RAR matches a RAPID assigned to the UE 6-00 in advance.

As a third procedure, the UE 6-00 may transmit a PUSCH to the gNB 6-10, which will be referred to herein as Msg3 (6-40). To this end, the UE 6-00 may determine whether to apply transform precoding to transmit the PUSCH (i.e., whether to transmit the PUSCH in a DFT-s-OFDM) or not (i.e., whether to transmit the PUSCH in an OFDM), based on an upper layer parameter msg3-transform precoding. In addition, the UE 6-00 may determine an SCS to be used for the transmission of the PUSCH according to an upper layer parameter msg3-scs. In this case, the Msg3 PUSCH is transmitted through a serving cell in which the PRACH has been transmitted.

As a fourth procedure, the gNB 6-10 may transmit a content resolution message to the UE 6-00, which will be referred to herein as Msg4 (6-50). The UE 6-00 starts a timer to receive the content resolution message, and monitors the PDCCH scrambled with a TC-RNTI in the type 1 PDCCH CSS until the timer expires. When the UE 6-00 successfully decodes the PDCCH, the UE 6-00 may decode a PDSCH including an MAC CE, and set the TC-RNTI to C-RNTI.

After successfully decoding Msg4 (6-50), the UE 6-00 may report a HARQ ACK indicating this fact to the gNB 6-10 to report whether the RACH procedure has been successfully completed to the gNB 6-10.

The RACH occasion (RO) described above may be understood as a time/frequency resource specified for reception of the RACH preamble. As described above, in 5G NR, multiple SSBs may be associated with different beams to operate multiple beams, and a UE may measure the multiple SSBs and select an optimal SSB (i.e., an optimal beam) by one of various methods such as reference signal received power (RSRP), reference signal received quality (RSRQ), a signal-to-noise ratio (SNR), a signal-to-noise/interference ratio (SINR), etc. Thereafter, the UE may determine a beam (i.e., a (TX) spatial filter) to be used for the transmission of the PRACH on the basis of a beam (i.e., an (RX) spatial filter) used to receive the optimal SSB. In this case, a relationship between a specific SSB and a specific RO may be set to allow a base station or network to identify an SSB (beam) selected by the UE. Through the above relationship, the base station may identify the SSB (beam) selected by the UE on the basis of on which RO the UE has transmitted the PRACH.

For example, a method of transmitting an SSB and receiving a PRACH on the basis of scheduling information in the beam management method will be described below.

For example, the beam information in the beam management method may not be configured together with the scheduling information.

As another example, the scheduling information may be periodically applied to a new type of repeater until other change information or other scheduling information is transmitted.

An SSB transmission beam setting method will be proposed below.

For example, a new type of repeater may receive a corresponding SSB beam among SSB beams transmitted from a base station through beam pairing with the base station for a link between the repeater and the base station.

As another example, the new type of repeater may perform beam transmission in the order of beam modes set for OAM with respect to part of an SSB to be transmitted as indicated by the base station.

A RACH preamble reception beam setting method will be proposed below.

For example, a new type of repeater may identify a reception period of a PRACH channel according to SSB beam transmission.

Alternatively, the base station may indicate a PRACH reception period to the new type of repeater through scheduling.

As another example, a reception beam may be formed in the order of beam modes corresponding to the technical feature 5.2.2 for a corresponding period.

Meanwhile, after the PRACH preamble is received, the following technical features may be applied.

For example, measurement may be performed on a corresponding signal in the same way as in the method of counteracting the instability of a link between the base station and the new type of repeater by the new type of repeater and a UE.

As another example, a method/technical characteristics that are the same as the method of counteracting the instability of the link between the base station and the new type of repeater by the new type of repeater and the UE may be applied to timing advance (TA) of a link between the new type of repeater and the UE. Here, TA is related to controlling uplink signal transmission timing and may be controlled through 1) RACH response (RAR) or 2) MAC-CE. For example, the UE may identify a TA value from two different MAC layer instructions according to a situation, and apply a TA value extracted from a RAR with respect to a first uplink message after the PRACH. After an initial RACH process, the UE may apply TA using a TA value extracted from a TA MAC-CE.

Here, the new type of repeater may forward a reception signal related to the TA for the link between the repeater and the UE.

In addition, the new type of repeater may estimate/calculate TA and transmit an estimated value to the base station.

Figure 22:
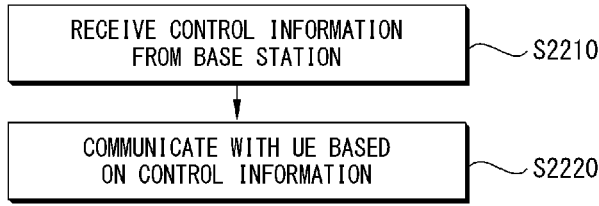
FIG. 22 is a flowchart of an example of a method performed by a communication device according to some embodiments of the present disclosure.

FIG. 22 is a flowchart of an example of a method performed by a communication device according to some embodiments of the present disclosure. The communication device is a communication device with a relay function and may include a UE, a new type of repeater, a base station, and/or an IAB node.

The communication device may receive control information from a base station (S2210). Here, the control information may include at least one of scheduling information and beam information. Here, the scheduling information may be information for the communication device to schedule transmission/reception with the UE. The beam information may inform the communication device of a beam to be used by the communication device to perform transmission/reception with the UE.

In addition, the communication device may communicate with the UE on the basis of the control information (S2220). Here, the communication device may transmit a signal to the UE using a transmission beam. In addition, the communication device may receive a signal from the UE using a reception beam. Here, the transmission beam and/or the reception beam may be set according to the control information. In other words, the communication device may determine at least one of the transmission beam and the reception beam on the basis of the control information.

In relation to FIG. 22, some or all of the technical features proposed in the present disclosure may be applied to a transmission method, a mapping method, and a configuration method of the control information, an operation method of the communication device, etc. Furthermore, some or all of the technical features proposed in the present disclosure may be applied to other operations not shown in FIG. 22, e.g., an operation method of the communication device according to the quality/reliability of a link between the base station and the communication device, a method of measuring and reporting a link between the UE and the communication device, etc. Accordingly, description of parts that are the same those described above is omitted here.

Figure 23:
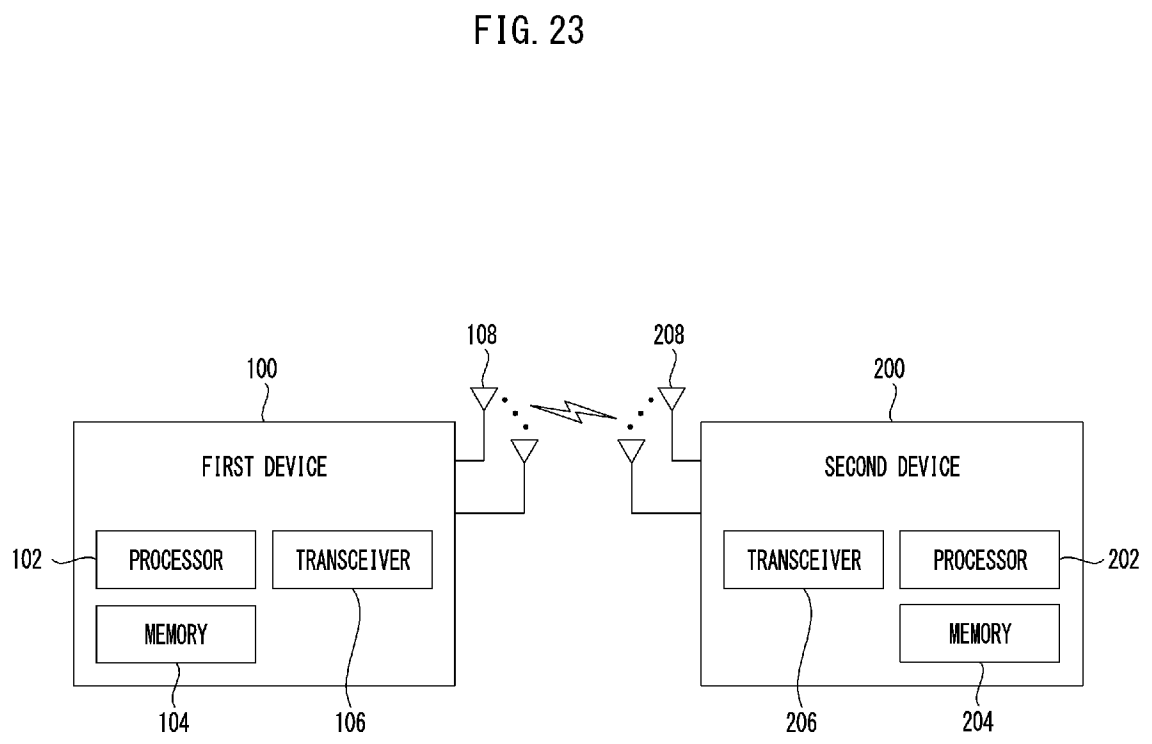

FIG. 23 illustrates examples of a wireless device applicable to the present disclosure.

Referring to FIG. 23, a first wireless device 100 and a second wireless device 200 may transmit and receive radio signals through various wireless access technologies (e.g., LTE and NR). Here, {the first wireless device 100 and the second wireless device 200} may correspond to {the base station 1410 and the new type of repeater 1420} of FIG. 14 and/or {the new type of repeater 1420 and the UE 1430} of FIG. 14 and/or {the base station 1510 and the new type of repeater 1520} of FIG. 15 and/or {the new type of repeater 1520 and the UE 1530} of FIG. 15 and/or {the base station 1610 and the new type of repeater 1630} of FIG. 15 and/or {the new type of repeater 1630 and the UE 1650} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202.

For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. In addition, the one or more processors 102 and 202 may perform control so that the one or more transceivers 106 and 206 may receive user data, control information, or radio signals from one or more other devices. In addition, the one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports). The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters.

The claims described herein may be combined in various ways. For example, an apparatus may be implemented from a combination of the technical features of the method claims of the present disclosure, and a method may be implemented from a combination of the technical features of the apparatus claims of the present disclosure. Alternatively, an apparatus may be implemented from a combination of the technical features of the method claims of the present disclosure and the technical features of the apparatus claims of the present disclosure, and a method may be implemented from a combination of the technical features of the method claims of the present disclosure and the technical features of the apparatus claims of the present disclosure.

What is claimed is:

1. A method performed by a user equipment (UE) in a wireless communication system, the method comprising:
   receiving first downlink control information (DCI) transmitted from a base station; and
   performing, with a communication device on the basis of the first DCI, communication in a first time resource determined based on a time offset and a second time resource in which the communication device receives second DCI from the base station,
   wherein the communication device comprises a device that relays a signal transmitted between the UE and the base station,
   the second DCI comprises a first field related to beam information and a second field related to a time resource, and
   the communication is performed based on at least one of the first field or the second field.

2. The method of claim 1, wherein the communication is performed using a beam aperiodically determined on the basis of the second DCI.

3. The method of claim 1, wherein the time offset is determined based on capability of the communication device.

4. The method of claim 1, wherein the first field indicates one of a plurality of beams set for the UE, and the second field indicates one of a plurality of time resources set for the UE.

5. The method of claim 4, wherein information about the plurality of beams and the plurality of time resources is transmitted to the UE through radio resource control (RRC) signaling.

6. The method of claim 4, wherein the plurality of beams are associated with the plurality of time resources.

7. The method of claim 6, wherein each of the plurality of beams is mapped to one of the plurality of time resources.

8. An apparatus comprising:
   a user equipment (UE) comprising:
   at least one memory storing instructions;
   at least one transceiver; and
   at least one processor configured to connect the at least one memory and the at least one transceiver,
   wherein the at least one processor executes the instructions to:
   receive first downlink control information (DCI) transmitted from a base station; and
   perform, with a communication device on the basis of the first DCI, communication in a first time resource determined based on a time offset and a second time resource in which the communication device receives second DCI from the base station,
   wherein the communication device comprises a device that relays a signal transmitted between the UE and the base station,
   the second DCI comprises a first field related to beam information and a second field related to a time resource, and
   the communication is performed based on at least one of the first field or the second field.

9. The apparatus of claim 8, wherein the communication is performed using a beam aperiodically determined on the basis of the second DCI.

10. The apparatus of claim 8, wherein the time offset is determined based on capability of the communication device.

11. The apparatus of claim 8, wherein the first field indicates one of a plurality of beams set for the UE, and the second field indicates one of a plurality of time resources set for the UE.

12. The apparatus of claim 11, wherein information about the plurality of beams and the plurality of time resources is transmitted to the UE through radio resource control (RRC) signaling.

13. The apparatus of claim 11, wherein the plurality of beams are associated with the plurality of time resources.

14. The apparatus of claim 13, wherein each of the plurality of beams is mapped to one of the plurality of time resources.

15. A non-transitory computer readable medium readable by at least one computer and storing instructions executable by at least one processor, wherein the instructions are executed by the at least one processor to:

receive first downlink control information (DCI) transmitted from a base station; and perform, with a communication device on the basis of the first DCI, communication in a first time resource determined based on a time offset and a second time resource in which the communication device receives second DCI from the base station, wherein the communication device comprises a device that relays a signal transmitted between a user equipment (UE) and the base station, the second DCI comprises a first field related to beam information and a second field related to a time resource, and the communication is performed based on at least one of the first field or the second field.

\* \* \* \* \*